United States Patent
Chen et al.

(10) Patent No.: US 9,848,197 B2
(45) Date of Patent: Dec. 19, 2017

(54) TRANSFORMS IN VIDEO CODING

(75) Inventors: Ying Chen, San Diego, CA (US);
Liwei Guo, San Diego, CA (US);
Peisong Chen, San Diego, CA (US);
Xianglin Wang, San Diego, CA (US);
Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 13/414,232

(22) Filed: Mar. 7, 2012

(65) Prior Publication Data

US 2012/0230421 A1    Sep. 13, 2012

Related U.S. Application Data

(60) Provisional application No. 61/451,581, filed on Mar. 10, 2011, provisional application No. 61/555,986, filed on Nov. 4, 2011.

(51) Int. Cl.
*H04N 19/122*    (2014.01)
*H04N 19/186*    (2014.01)
(Continued)

(52) U.S. Cl.
CPC ......... *H04N 19/186* (2014.11); *H04N 19/122* (2014.11); *H04N 19/176* (2014.11); *H04N 19/96* (2014.11)

(58) Field of Classification Search
CPC ....... H04N 19/00969; H04N 19/00315; H04N 7/26148; H04N 19/00278; H04N 7/26101; H04N 19/00084; H04N 19/122
(Continued)

(56) References Cited

U.S. PATENT DOCUMENTS 6,005,981 A * 12/1999 Ng .............................. G06T 9/40
                                                                                                375/E7.148
8,737,474 B2    5/2014 Goa et al.
(Continued)

FOREIGN PATENT DOCUMENTS

CN          1857001 A    11/2006
CN       101415120 A     4/2009
(Continued)

OTHER PUBLICATIONS

Marpe et al., hereinafter "Marpe" (Video Compression Using Nested Quadtree Structures, Leaf Merging, and Improved Techniques for Motion Representation and Entropy Coding, Circuits and Systems for Video Technology, IEEE Transactions on (vol. 20 , Issue: 12; Dec. 2010, pp. 1676-1687)).*
(Continued)

*Primary Examiner* — Dave Czekaj
*Assistant Examiner* — Berteau Joisil

(57) ABSTRACT

Aspects of this disclosure relate to a method of coding video data. In an example, the method includes determining a first residual quadtree (RQT) depth at which to apply a first transform to luma information associated with a block of video data, wherein the RQT represents a manner in which transforms are applied to luma information and chroma information. The method also includes determining a second RQT depth at which to apply a second transform to the chroma information associated with the block of video data, wherein the second RQT depth is different than the first RQT depth. The method also includes coding the luma information at the first RQT depth and the chroma information at the second RQT depth.

35 Claims, 9 Drawing Sheets

(51) Int. Cl.
H04N 19/176 (2014.01)
H04N 19/96 (2014.01)

(58) Field of Classification Search
USPC .................................................. 375/240.18
See application file for complete search history.

(56) References Cited

U.S. PATENT DOCUMENTS

| | | | |
|---|---|---|---|
| 8,798,149 B2 | 8/2014 | Wu et al. | |
| 2004/0264792 A1* | 12/2004 | Hwang | H04N 19/105 382/240 |
| 2006/0251330 A1* | 11/2006 | Toth et al. | 382/236 |
| 2011/0038422 A1 | 2/2011 | Cheon et al. | |
| 2011/0170012 A1 | 7/2011 | Cheon et al. | |
| 2011/0255555 A1* | 10/2011 | Alexander | 370/468 |
| 2012/0177116 A1 | 7/2012 | Panusopone et al. | |
| 2012/0183080 A1 | 7/2012 | Zhou | |
| 2013/0039422 A1 | 2/2013 | Kirchhoffer et al. | |
| 2013/0195370 A1 | 8/2013 | Sasai et al. | |

FOREIGN PATENT DOCUMENTS

| | | |
|---|---|---|
| CN | 101796841 A | 8/2010 |
| EP | 2169961 A1 | 3/2010 |
| WO | 2004104930 A2 | 12/2004 |
| WO | 2009001864 A1 | 12/2008 |
| WO | WO 2011019383 A2 | 2/2011 |
| WO | WO 2011068527 A1 | 6/2011 |
| WO | 2011128269 A1 | 10/2011 |
| WO | WO 2011126348 A2 | 10/2011 |
| WO | 2013102299 A1 | 7/2013 |

OTHER PUBLICATIONS

"Marpe" (Video Compression Using Nested Quadtree Structures, Leaf Merging, and Improved Techniques for Motion Representation and Entropy Coding, Circuits and Systems for Video Technology, IEEE Transactions on (vol. 20 , Issue: 12; Dec. 2010, pp. 1676-1687)).*
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
International Preliminary Report on Patentability—PCT/US2012/028233, The International Bureau of WIPO—Geneva, Switzerland, Apr. 29, 2013 (9 pages).
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
Guo et al., "Limiting Chroma Transform Depth in Residue Quad Tree (RQT)", Joint Collaborative Team on Video Coding, JCTVC-E377, Mar. 16-23, 2011, 3 pp.
International Search Report and Written Opinion—PCT/US2012/028233, International Search Authority—European Patent Office, dated May 21, 2012—12 pp.
International Telecommunication Union, "Advanced video coding for generic audiovisual services," Standardization Sector of ITU, Jun. 2011, 674 pp.
Reply to Written Opinion dated May 21, 2012, from international application No. PCT/US2012/028233, filed Jan. 9, 2013, 5 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al.," WD1: Working Draft 1 of High-Efficiency Video Coding", Joint Collaborative Team on Video Coding, JCTVC-C403, Oct. 7-15, 2010, 137 pp.
Written Opinion of the International Preliminary Examining Authority—PCT/US2012/028233, European Patent Office, dated Feb. 11, 2013—6 pp.
Zhou et al., "Evaluation Results on Residual Quad Tree (RQT)", Joint Collaborative Team on Video Coding, JCTVC-D060, Jan. 20-28, 2011, 7 pp.
Reply to Written Opinion dated Feb. 11, 2013, from international application No. PCT/US2012/028233, filed Apr. 10, 2013, 4 pp.
Office Action from counterpart European Application No. 12 709 002.5-1908, dated Jul. 9, 2014, 6 pp.
Taiwan Search Report from counterpart Taiwan Application No. TW101107931 dated Oct. 10, 2014, 9 pp. [Translation of parts].
Wiegand, et al., "BoG report: residual quadtree structure", MPEG Meeting; Oct. 11 2010-Oct. 15, 2010; Guangzhou; (Motion Picture Expert Group or ISO/IEC JTC1/SC29/WG11), No. M18590, Oct. 28, 2010, XP030047180, 17 pp.
Notice of Grounds for Rejection from counterpart Korean Application No. 2013-7026612, dated Nov. 29, 2014, 7 pp.
Response to European Office Action dated Jul. 9, 2014, from counterpart European Patent Application No. 12 709 002.5-1908, filed on Nov. 10, 2014, 5 pp.
First Office Action from corresponding Japanese Application No. 2013-557854 dated Jan. 20, 2015 (10 pages).
Notice of Final Rejection from corresponding Korean Application Serial No. 2013-7026612 dated Jul. 28, 2015 (6 pages).
Notice of Final Rejection from corresponding Korean Application Serial No. 2013-7026612 dated Dec. 2, 2015 (6 pages).
Bossen F., "Common test conditions and software reference configurations," Document: JCTVC-D600, WG11 No. m19497, Joint Collaborative Team on Video Coding (JCT-VC) of ITU-T SG16 WP3 and ISO/IEC JTC1/SC29/WG11, 4th Meeting: Daegu, KR, Jan. 20-28, 2011, 9 pages.
Zhao X., et al., "Residue Quad Tree Depth for Chroma in Intra Coding", 7th JCT-VC Meeting, JCTVC-G283, 98, MPEG Meeting, Nov. 21, 2011-Nov. 30, 2011, Geneva, Nov. 2011, 6 pages.
European Search Report—EP15199841.6—Search Authority—Munich—dated Mar. 7, 2016, 9 pp.

* cited by examiner

TRANSFORMS IN VIDEO CODING

This application claims priority to U.S. Provisional Patent Application No. 61/451,581, filed Mar. 10, 2011, and U.S. Provisional Patent Application No. 61/555,986, filed Nov. 4, 2011, the entire contents of both of which are hereby incorporated by reference in their entirety.

TECHNICAL FIELD

This disclosure relates to video coding and, more particularly, to the use of transforms in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The techniques of this disclosure generally relate to applying transforms in video coding. For example, the techniques of this disclosure include applying differently sized transforms to luma information and chroma information associated with a block of video data. That is, during video coding, a video coder may divide a block of video data according to a hierarchical quadtree partitioning structure. In addition, for each block, the video coder may calculate residual values corresponding to pixel differences between pixels of the unencoded picture and predicted pixel values. The video coder may then apply a transform (e.g., a discrete cosine transform (DCT), an integer transform, a wavelet transform, or a conceptually similar transform) to the residual video data to produce residual transform coefficients.

The techniques of this disclosure include applying transforms to luma information at a different quadtree depth than chroma information. For example, aspects of this disclosure relate to decoupling the manner in which transforms are applied to luma information and chroma information. Accordingly, in some instances, a certain transform may be applied to luma information at a first quadtree depth (e.g., representing the number of times a block of video data has been divided), while another transform may be applied to chroma information at a second, different quadtree depth than the luma information. In other instances, the transforms may be applied at the same quadtree depth.

In an example, aspects of this disclosure relate to a method of coding video data. The method includes determining a first residual quadtree (RQT) depth at which to apply a first transform to luma information associated with a block of video data, wherein the RQT represents a manner in which transforms are applied to luma information and chroma information; determining a second RQT depth at which to apply a second transform to the chroma information associated with the block of video data, wherein the second RQT depth is different than the first RQT depth; and coding the luma information at the first RQT depth and the chroma information at the second RQT depth.

In another example, aspects of this disclosure relate to an apparatus for coding video data. The apparatus includes one or more processors that are configured to determine a first residual quadtree (RQT) depth at which to apply a first transform to luma information associated with a block of video data, wherein the RQT represents a manner in which transforms are applied to luma information and chroma information; determine a second RQT depth at which to apply a second transform to the chroma information associated with the block of video data, wherein the second RQT depth is different than the first RQT depth; and code the luma information at the first RQT depth and the chroma information at the second RQT depth.

In another example, aspects of this disclosure relate to an apparatus for coding video data. The apparatus includes a means for determining a first residual quadtree (RQT) depth at which to apply a first transform to luma information associated with a block of video data, wherein the RQT represents a manner in which transforms are applied to luma information and chroma information; a means for determining a second RQT depth at which to apply a second transform to the chroma information associated with the block of video data, wherein the second RQT depth is different than the first RQT depth; and a means for coding the luma information at the first RQT depth and the chroma information at the second RQT depth.

In another example, aspects of this disclosure relate to a computer program product comprising a computer-readable storage medium having stored thereon instructions that, when executed, cause one or more processors of a device for coding video data to determine a first residual quadtree (RQT) depth at which to apply a first transform to luma information associated with a block of video data, wherein the RQT represents a manner in which transforms are applied to luma information and chroma information; determine a second RQT depth at which to apply a second transform to the chroma information associated with the block of video data, wherein the second RQT depth is different than the first RQT depth; and code the luma information at the first RQT depth and the chroma information at the second RQT depth.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
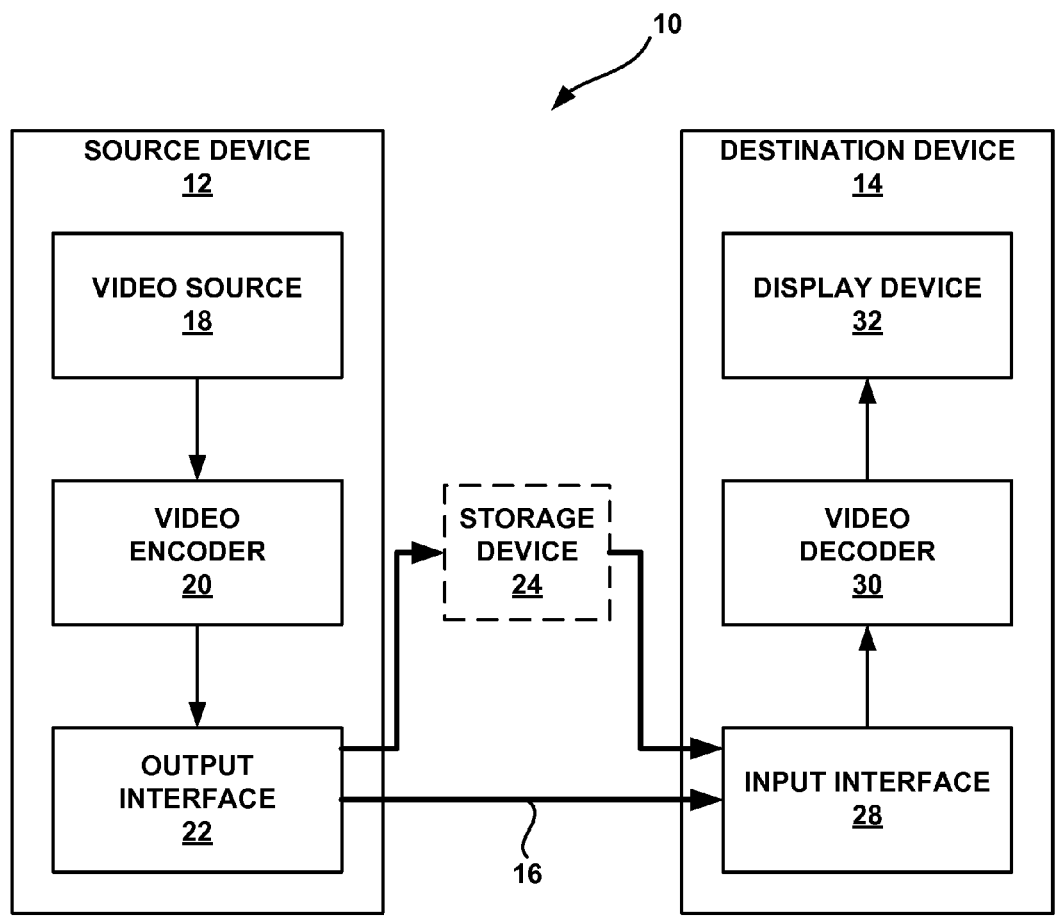
FIG. 1 is a block diagram illustrating an example video encoding and decoding system that may utilize the techniques described in this disclosure.

The JCT-VC is working on development of the HEVC standard. The HEVC standardization efforts are based on an evolving model of a video coding device referred to as the HEVC Test Model (HM). In general, according to the proposed HEVC standard, a video frame or picture may be divided into a sequence of treeblocks or largest coding units (LCU) that include both luma and chroma samples. For example, a treeblock generally includes an N×N block of luma samples (Y) together with the two corresponding blocks of chroma samples (Cb, Cr) for a picture that has three sample arrays. In some examples, chroma information may be sub-sampled with respect to luma information. That is, for a given block of video data, a luma component may be sampled at twice the rate of a chroma component.

Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. For example, a treeblock, as a root node (e.g., LCU) of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split (e.g., which may be referred to as a maximum CU depth), and may also define a minimum size of the coding nodes.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. In some examples, residual samples corresponding to a CU may be subdivided into smaller units using a quadtree structure known as "residual quad tree" (RQT). The RQT may apply to both luma and chroma components of the CU. Thus, in general, an RQT is a recursive representation of the partitioning of a CU into TUs. TUs define the manner in which transforms are applied to luma and chroma samples. That is, for example, pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into four sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

Coding efficiency may be improved by avoiding large variations in residual values associated with a given TU. That is, applying a transform to generally uniform residual values may result in concentrating energy in a relatively small number of transform coefficients, thereby improving entropy coding efficiency (e.g., as described in greater detail below with respect to FIG. 2). Luma samples of a given frame (or slice) may typically be subject to wider and/or more dramatic variation than chroma samples. Chroma samples, on the other hand, may be relatively uniform for a given block. Accordingly, while a relatively small transform size may be needed to avoid large luma residual variations, larger transforms may be used for chroma residuals without impacting coding efficiency.

Typically, a video coder applies transforms to both the luma and chroma samples at the same RQT depth. However, because luma information may be sampled at a higher rate than chroma information, the sizes of the transforms applied to luma and chroma samples may be different. In an example for purposes of illustration, a 32×32 TU may be split twice according to an RQT structure. In this example, an 8×8 transform size may be applied to the luma samples of the leaf-TUs, while a 4×4 transform size may be applied to the chroma samples of the leaf-TUs (assuming luma information is sampled at twice the rate of chroma information).

The techniques of this disclosure relate to applying different sizes of transforms to luma samples and chroma samples of a block residual video data. More specifically, the techniques of this disclosure include applying transforms to luma and chroma components associated with a TU at different depths (e.g., according to an RQT structure) of a TU. That is, for example, a transform may be applied to luma samples of a TU at the leaf nodes of the TU, while a transform may be applied to chroma components at a higher depth of the TU (e.g., where "higher" is associated with a less deep position in an RQT structure).

In an example for purposes of explanation, a 64×64 TU (e.g., 64×64 residual luma samples and 32×32 residual chroma samples, assuming luma is sampled at twice the rate of chroma) may be split three times according to an RQT. In this example, the TU includes 8×8 leaf-TUs at a depth of three. A video coder may apply a transform to the luma samples at a depth of three (e.g., to the 8×8 luma samples of the leaf-TUs), while applying a transform to the chroma samples at a depth of one (e.g., to the 16×16 for chroma samples).

To be clear, some aspects of this disclosure relate not only to applying differently sized transforms to luma and chroma samples of a given block, but to applying transforms to luma and chroma samples at different depths of an RQT structure. That is, in some video coding systems, as noted above, it is typical to sample luma components at a higher rate than chroma components, and thus a larger transform will generally be applied to the luma samples than the chroma samples of a given block (due to the larger number of luma samples). Aspects of this disclosure relate to decoupling the manner in which transforms are applied, such that a transform may be applied to luma samples at a first depth, while a transform may be applied to chroma samples at a second, different depth than the luma samples.

In this way, transforms may be applied to chroma samples at a relatively coarser granularity than luma samples for a given block of video data. Applying transforms in this way may lead to decreased coding complexity. For example, the techniques of this disclosure allow transforms to be applied to larger blocks of chroma samples, where less specificity may be needed, than luma samples, where more specificity may be needed.

FIG. 1 is a block diagram illustrating an example video encoding and decoding system 10 that may utilize the techniques described in this disclosure for applying a transform to luma samples at a different RQT depth than chroma samples of a block of residual data. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads or tablets, televisions, cameras, display devices, digital media players, video gaming consoles, video streaming or playback devices, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 24. Similarly, encoded data may be accessed from storage device 24 by input interface. Storage device 24 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 24 may correspond to a file server or another intermediate storage device that may hold the encoded video generated by source device 12. Destination device 14 may access stored video data from storage device 24 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 24 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 24 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 24, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, including a processor such as one or more microprocessors, digital signal processors (DSPs), special purpose processors or processing circuits, application specific integrated circuits (ASICs), field programmable gate arrays (FPGAs), fixed logic circuitry, discrete logic, software, hardware, firmware or any combinations thereof. Accordingly, the various units within video encoder 20 and video decoder 30 likewise may be implemented by any of a variety of such structural elements or combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

As noted above, the JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded, original picture and prediction values corresponding to the PUs. Video encoder 20 may form the TUs including the residual data for the CU, and then transform the TUs to produce transform coefficients for the CU.

In some examples, TUs may be defined according to a residual quad tree (RQT). For example, an RQT may represent the manner in which transforms (e.g., DCT, integer transform, wavelet transform, or one or more other transforms) are applied to the residual luma samples and the residual chroma samples associated with a block of video data. That is, as noted above, residual samples corresponding to a CU may be subdivided into smaller units using an RQT. In general, the RQT is a recursive representation of the partitioning of a CU into TUs.

Video encoder 20 may typically apply transforms to luma and chroma samples at the same depth of the RQT. For example, in general, video encoder 20 may apply transforms to the relatively lowest RQT depth, where a lower RQT depth translates to smaller TUs having less associated residual data (e.g., the leaf-TUs). In some instances, however, chroma information may not vary as widely and/or dramatically as luma information for a given block of video data. Rather, the chroma information in a associated with a CU may be more smooth than the luma information. Accordingly, applying transforms to the chroma information at the same RQT depth as the luma information may not be necessary to achieve a chroma transformation that compacts as much data (also referred to as "energy") into as few transform coefficients as possible. That is, applying a relatively larger transform to chroma samples (e.g., at a higher RQT depth) may still compact chroma data into relatively few coefficients.

According to aspects of this disclosure, video encoder 20 may decouple the manner in which transforms are applied to luma samples and chroma samples. For example, video encoder 20 may determine a first RQT depth at which to apply a transform to the residual luma samples, and a second RQT depth at which to apply a second transform to the residual chroma samples, wherein the first and second RQT depths may be different from one another. In some instances, the second RQT depth (associated with the chroma samples) may be different than the first RQT depth. Video encoder 20 may then apply the first transform to the residual luma samples at the first RQT depth to generate luma transform coefficients, and apply the second transform to the residual chroma samples at the second RQT depth to generate chroma transform coefficients.

Accordingly, video encoder 20 may apply a transform to chroma samples at a relatively coarser granularity than luma samples for a given block of video data. In this way, video encoder 20 may reduce overall coding complexity. For example, a relatively larger transform may be applied to chroma samples of a given block of data, thereby reducing the complexity associated with applying multiple, relatively smaller transforms to the chroma samples.

Following application of any transforms to residual data to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data. A current version of HEVC is designed to use CABAC for entropy coding.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30, upon receiving the coded video data from video encoder 20, may perform a decoding pass generally reciprocal to the encoding pass described with respect to video encoder 20. According to aspects of this disclosure, for example, video decoder 30 may receive coded video data and determine an RQT for residual luma samples and residual chroma samples associated with a block of video data. Video decoder 30 may also determine a first RQT depth at which to apply an inverse transform to the residual luma samples, and a second RQT depth at which to apply a second inverse transform to the residual chroma samples. In some instances, the second RQT depth (associated with the chroma samples) may be different than the first RQT depth. Video decoder 30 may then apply the first inverse transform to the residual luma samples at the first RQT depth to generate luma transform coefficients, and apply the second inverse transform to the residual chroma samples at the second RQT depth to generate chroma transform coefficients.

Figure 2:
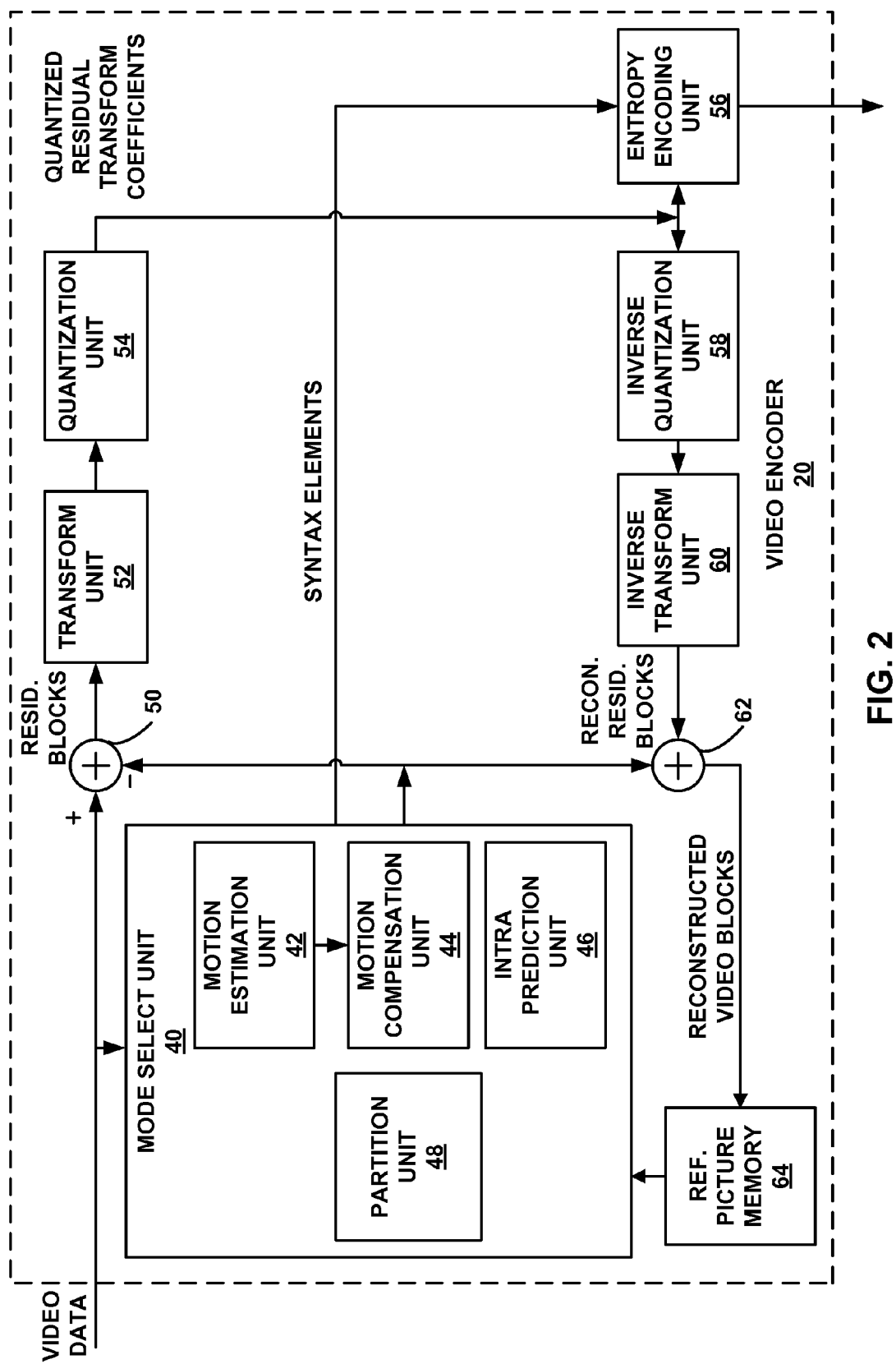
FIG. 2 is a block diagram illustrating an example video encoder that may implement the techniques described in this disclosure.

FIG. 2 is a block diagram illustrating an example video encoder 20 that may implement the techniques described in this disclosure for applying a transform to luma samples at a different RQT depth than chroma samples of a block of residual data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives video data to be encoded. In the example of FIG. 2, video encoder 20 includes a mode select unit 40, summer 50, transform unit 52, quantization unit 54, entropy encoding unit 56, and reference picture memory 64. Mode select unit 40, in turn, includes motion estimation unit 42, motion compensation unit 44, intra prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may alternatively perform intra-predictive coding of the received video block relative to one or more neighboring blocks in the same frame or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, also referred to as residual data, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

According to aspects of this disclosure, transform processing unit 52 may determine a RQT that represents the manner in which transforms (e.g., DCT, integer transform, wavelet transform, or one or more other transforms) are applied to the residual luma samples and the residual chroma samples associated with a block of video data. According to aspects of this disclosure, transform processing unit 52 may decouple the manner in which transforms are applied to luma samples and chroma samples. For example, transform processing unit 52 may also determine a first RQT depth at which to apply a transform to the residual luma samples, and a second RQT depth at which to apply a second transform to the residual chroma samples. In some instances, the second RQT depth (associated with the chroma samples) may be different than the first RQT depth. Transform processing unit 52 may then apply the first transform to the residual luma samples at the first RQT depth to generate luma transform coefficients, and apply the second transform to the residual chroma samples at the second RQT depth to generate chroma transform coefficients.

In an example for purposes of illustration, assume a 32×32 block of residual video data has chroma samples that are sub-sampled with respect to luma samples, such that the 32×32 block includes 32×32 residual luma samples and 16×16 residual chroma samples (e.g., as occurs in a 4:2:0 sub-sampling scheme). Transform processing unit 52 (or another unit, such as mode select unit 40) may perform a rate-distortion analysis to determine the manner in which to apply transforms to the block of residual values. In this example, assume transform processing unit 52 splits the block of residual values twice for the purposes of transformation. That is, transform processing unit 52 applies a transform to each 8×8 block of luma samples. According to the aspects of this disclosure, rather than applying a transform to the corresponding 4×4 block of chroma samples (e.g., at the same depth), transform processing unit 52 may apply a transform to a relatively larger block of chroma samples. For example, transform processing unit 52 may apply a transform to a 16×16 block of chroma samples (e.g., undivided), or an 8×8 block of chroma samples.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 is an example of a video encoder that may perform a method including determining a first residual quadtree (RQT) depth at which to apply a first transform to luma information associated with a block of video data, wherein the RQT represents a manner in which transforms are applied to luma information and chroma information; determining a second RQT depth at which to apply a second transform to the chroma information associated with the block of video data, wherein the second RQT depth is different than the first RQT depth, and coding the luma information at the first RQT depth and the chroma information at the second RQT depth.

Figure 3:
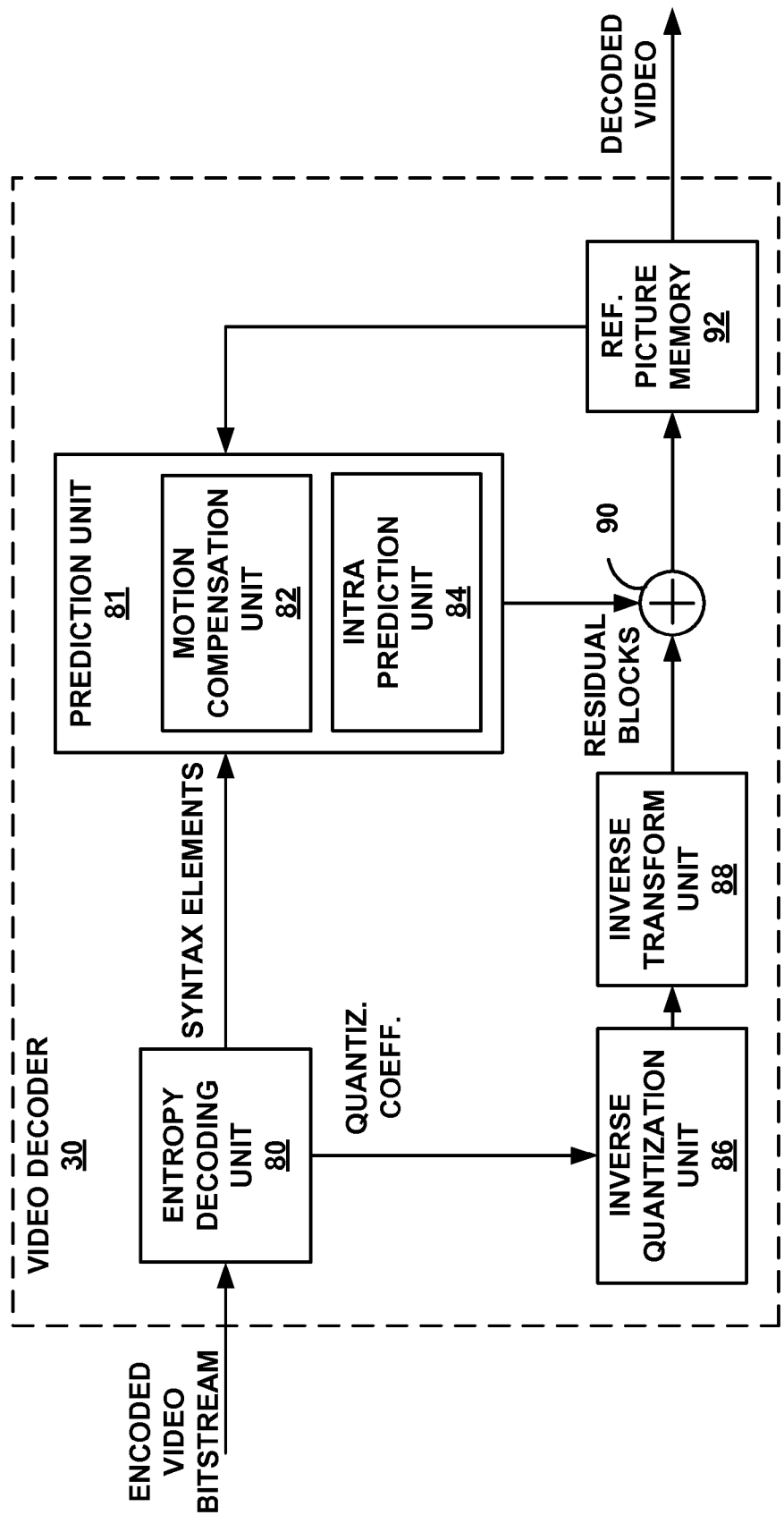
FIG. 3 is a block diagram illustrating an example video decoder that may implement the techniques described in this disclosure.

FIG. 3 is a block diagram illustrating an example video decoder 30 that may implement the techniques described in this disclosure for applying a transform to luma samples at a different RQT depth than chroma samples of a block of residual data. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI). For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

When the video slice is coded as an intra-coded (I) slice, intra prediction unit 84 of prediction unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform unit 88 may determine the manner in which transforms were applied to residual data. That is, for example, inverse transform unit 88 may determine an RQT that represents the manner in which transforms (e.g., DCT, integer transform, wavelet transform, or one or more other transforms) were applied to the residual luma samples and the residual chroma samples associated with a block of received video data.

According to aspects of this disclosure, the manner in which transforms are applied to luma samples and chroma samples may be decoupled. Accordingly, inverse transform unit 88 may also determine a first RQT depth at which to apply an inverse transform to the residual luma samples, and a second RQT depth at which to apply a second inverse transform to the residual chroma samples. In some instances, the second RQT depth (associated with the chroma samples) at which the inverse transform is applied may be different than the first RQT depth at which the inverse transform is applied. Inverse transform unit 88 may then apply the first inverse transform to the residual luma samples at the first RQT depth to generate luma transform coefficients, and apply the second inverse transform to the residual chroma samples at the second RQT depth to generate chroma transform coefficients.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 is an example of a video decoder that may perform a method including determining a first residual quadtree (RQT) depth at which to apply a first transform to luma information associated with a block of video data, wherein the RQT represents a manner in which transforms are applied to luma information and chroma information; determining a second RQT depth at which to apply a second transform to the chroma information associated with the block of video data, wherein the second RQT depth is different than the first RQT depth, and coding the luma information at the first RQT depth and the chroma information at the second RQT depth.

Figure 4:
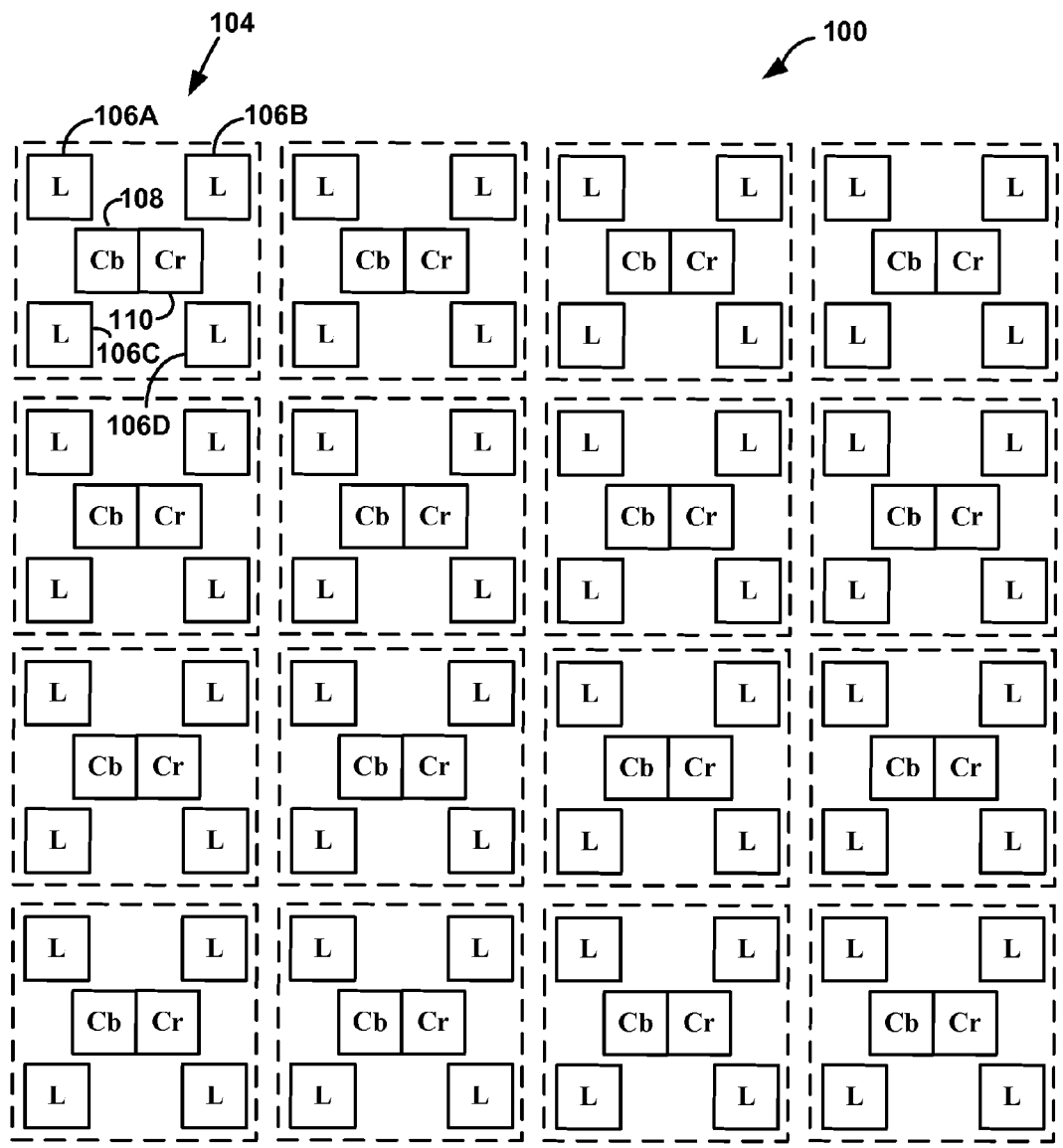
FIG. 4 illustrates an example block of video data including luma and chroma samples associated with the block of video data.

FIG. 4 illustrates an example block 100 of video data including luma samples 106A-D (luma samples 106) and chroma samples 108 (Cb) and 110 (Cr). The example shown in FIG. 4 generally illustrates nominal vertical and horizontal locations luma samples 106 and chroma samples 108, 110 that have been sampled according to a 4:2:0 sampling scheme. For example, as shown in FIG. 4, luma samples 106 are sampled at twice the rate of chroma samples 108, 110 in both the horizontal and vertical directions, with the chroma samples 108, 110 being sampled at the same rate.

The example shown in FIG. 4 is only one possible sampling scheme provided for purposes of explanation. That is, in other examples, different formats may specify different horizontal and vertical sampling rate ratios between the luma component and the chroma component. For example, for a block of video data with 4:2:2 format, the width of the luma component may be twice that of the chroma component. However, the height of the luma component may be the same as that for the chroma component. For a block of video data with a 4:4:4 format, the luma component and the chroma may be sampled at the same rates. The syntax for the luma and chroma arrays may be ordered such when data for all three color components is present, the data for the luma array is first, followed by data for the Cb array, followed by data for the Cr array, unless otherwise specified.

The example shown in FIG. 4 illustrates the luma component being sampled at a higher rate than the chroma components. In some instances, luma may be sampled at a higher rate than chroma, because the human eye is typically more sensitive to variations in luma than in chroma. Moreover, in general, luma samples may be subject to a wider and more dramatic variation within a given frame than chroma samples.

As noted above, the techniques of this disclosure include applying different sizes of transforms to luma components and chroma components of a block of video data. However, as shown in the example of FIG. 4, in some video coding schemes luma components may be sampled at a higher rate than chroma components. In such instances, a larger transform will generally be applied to the luma samples than the chroma samples of a given block, such as the block of video data shown in FIG. 4 (due to the larger number of samples).

Thus, the techniques of this disclosure not only include applying different sizes of transforms to luma and chroma samples of a block, but decoupling the manner in which transforms may be applied to luma and chroma components. That is, the techniques of this disclosure include applying transforms to luma and chroma components associated with a block of video data at different depths of a quadtree structure, in instances in which a block of video data is divided for purposes of transformation. For example, in an example that conforms to the HEVC standard currently being developed, a transform may be applied to luma components of a TU at the leaf nodes of a TU, while a transform may be applied to chroma components at a higher depth of the TU.

Figure 5A:
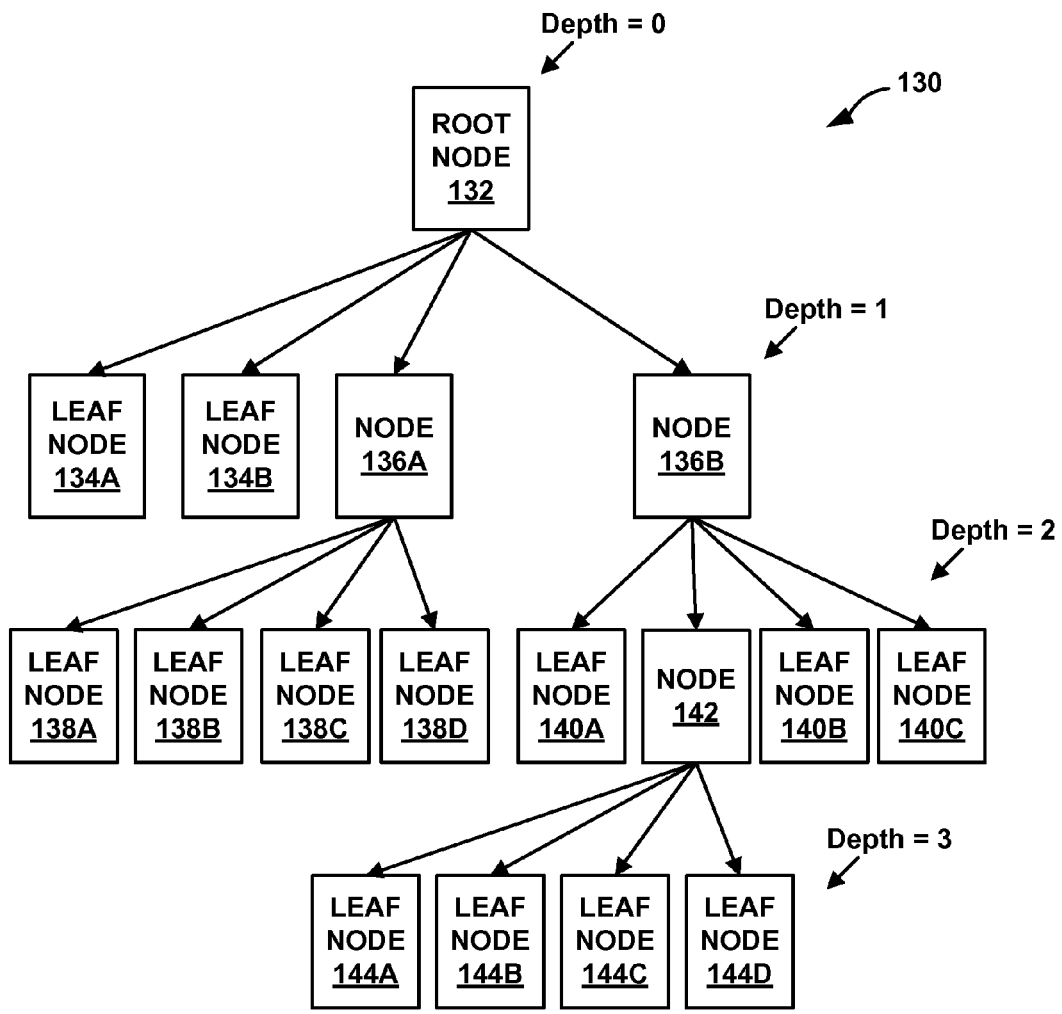
FIG. 5A illustrates an example hierarchical quadtree structure, according to aspects of this disclosure.
Figure 5B:
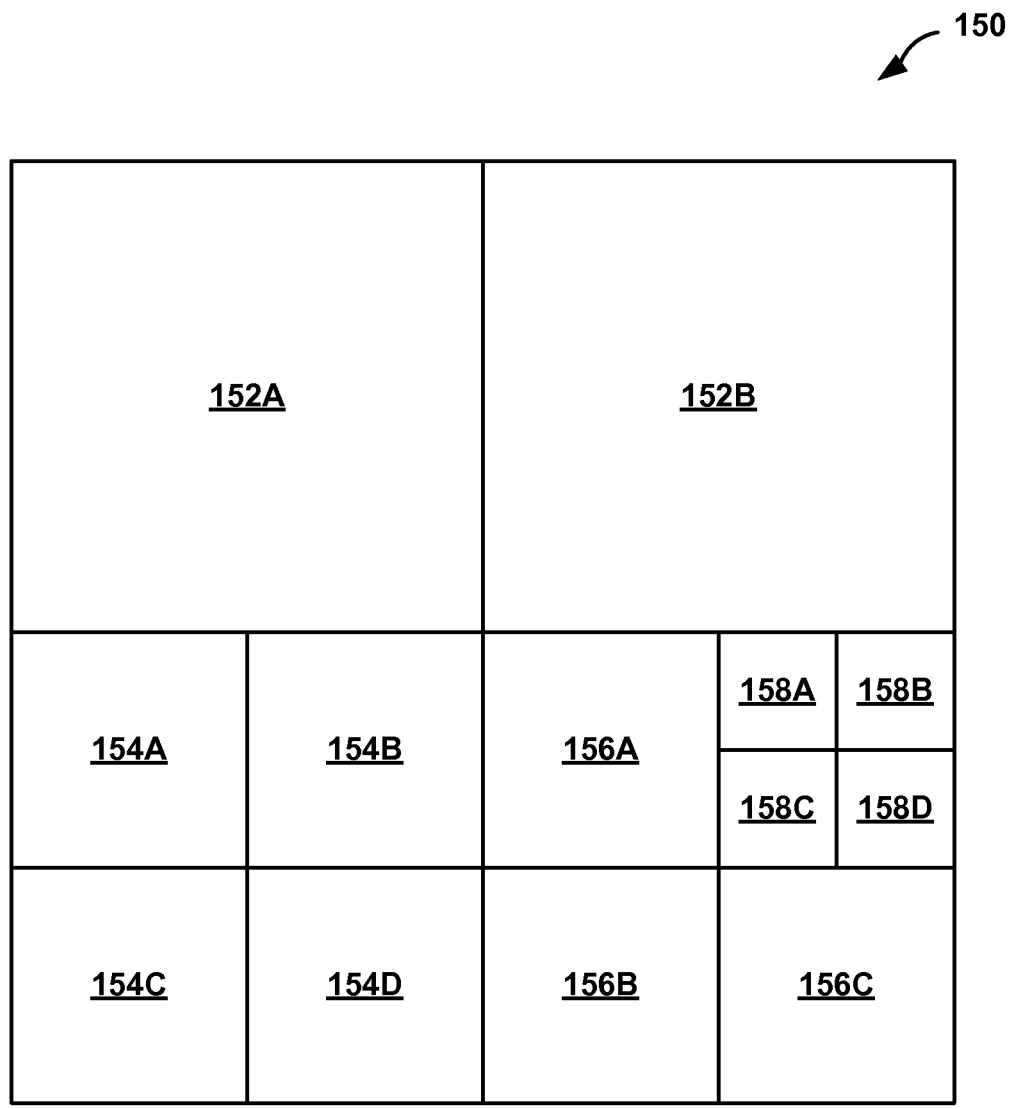
FIG. 5B illustrates an example division of a transform unit according to the hierarchical quadtree structure shown in FIG. 5A.

FIGS. 5A and 5B are conceptual diagrams illustrating an example residual quadtree (RQT) 130 (FIG. 5A) and corresponding transform unit 150 (FIG. 3B), respectively, consistent with the techniques of this disclosure. RQT 130 includes nodes arranged in a hierarchical fashion. Each node may be a leaf node with no children, or may have four child nodes, hence the name "quadtree." In the example of FIG. 5A, residual quadtree 130 includes root node 132. Root node 132 has four child nodes, including leaf nodes 134A and 134B (leaf nodes 134) and nodes 136A and 136B (nodes 136). Because nodes 136 are not leaf nodes, nodes 136 each include four child nodes. That is, in the example shown in FIG. 5A, node 136A has four child leaf nodes 138A-138D, while node 136B has three leaf nodes 140A-140C (leaf nodes 140) and node 142. In addition, node 142 has four leaf nodes 144A-144D (leaf nodes 144).

RQT 130 may include data describing characteristics of a corresponding transform unit (TU), such as TU 150 in this example. For example, RQT 130, by its structure, may describe splitting of TU 150 of FIG. 5B into sub-TUs. Assume that TU 150 has a size of 2N×2N. In this example, TU 150 has four sub-TUs, with two sub-TUs 152A and 152B (sub-TUs 152) of a size N×N. The remaining two sub-TUs of TU 150 are further split into smaller sub-CUs. That is, in the example shown in FIG. 5B, one of the sub-TUs of TU 150 is split into sub-TUs 154A-154D of size N/2×N/2, while the other sub-TU of TU 150 is split into sub-TUs 156A-156C (sub-TUs 156) of size N/2×N/2 and a further divided sub-TU, identified as sub-TUs 158A-158BD (sub-TUs 158) of a size N/4×N/4.

In the example shown in FIGS. 5A and 5B, the structure of RQT 130 corresponds to the splitting of TU 150. That is, root node 132 corresponds to TU 150 and leaf nodes 134 correspond to sub-TUs 152. Moreover, leaf nodes 138 (which is a child node of node 136A, which typically means that node 136A includes a pointer referencing leaf node 138) correspond to sub-TUs 154, leaf nodes 140 (e.g., belonging to node 136B) correspond to sub-TUs 156, and leaf nodes 144 (e.g., belonging to node 142) correspond to sub-TUs 158.

Data for nodes of RQT 130 may describe whether the TU corresponding to the node is split. If the TU is split, four additional nodes may be present in RQT 130. In some examples, a node of a quadtree may be defined by a process represented by the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the TU corresponding to the current node is split. If the TU is not split, the split_flag value may be '0', while if the TU is split, the split_flag value may be '1'. With respect to the example of residual quadtree 130, an array of split flag values may be 10011000001000000, which define the splitting structure from root node 132 down to the smallest leaf node (144A-144D).

A video coder, such as video encoder 20 and/or video decoder 30, typically applies transforms to both the luma and chroma samples at the same RQT depth. RQT depth generally relates to the number of times a TU has been split (e.g., RQT depth one corresponds to one division of the TU, as shown in FIG. 5B). In some examples, the video coder may apply transforms to luma and chroma samples of the leaf-nodes, such as leaf-nodes 134, 138, 140, and 144 shown in FIG. 5A (corresponding to leaf-TUs 152, 154, 156, and 158 shown in FIG. 5B).

The techniques of this disclosure include applying transforms to luma and chroma components associated with a TU at different depths, e.g., different depths of an RQT such as RQT 130 shown in FIG. 5A. That is, for example, a video coder may apply a transform to luma components of leaf nodes 134, 138, 140, and 144, while applying a transform to chroma components at other, non-leaf nodes. While certain aspects of FIGS. 5A and 5B are described below as being carried out by video encoder 20 (FIGS. 1 and 2), it should be understood that the techniques may also be carried out by another video coder, such as video decoder 30 (FIGS. 1 and 3). For example, video decoder 30 may determine and apply inverse transforms to coded video data according to the aspects of this disclosure.

In an example for purposes of explanation, TU 150 (corresponding to root node 132) may be a 64×64 TU (e.g., 64×64 luma samples and 32×32 chroma samples, assuming luma is sampled at twice the rate of chroma according to a 4:2:0 chroma format). Video encoder 20 may generally apply transforms to TUs of leaf nodes, such as leaf nodes 134, 138, 140, and 144. That is, video encoder 20 may apply transforms to luma and chroma samples at RQT depth one for leaf nodes 134, at RQT depth two for leaf nodes 138 and 140, and RQT depth three for leaf nodes 144. Thus, in this example, video encoder 20 may apply a 32×32 transform to luma samples and a 16×16 transform to chroma samples of sub-TUs 152, a 16×16 transform to luma samples and an 8×8 transform to chroma samples of sub-TUs 154 and 156, and an 8×8 transform to luma samples and a 4×4 transform to chroma samples of sub-TUs 158.

Aspects of this disclosure relate to applying transforms to luma and chroma samples at different depths of a quadtree structure. In the example above, video encoder 20 may apply a transform to luma samples at leaf nodes 134 (RQT depth one), 138 (RQT depth two), 140 (RQT depth two), and 144 (RQT depth three), while applying a single transform to chroma samples at a higher RQT depth. In an example, video encoder 20 may apply a transform to chroma samples at RQT depth zero. In this example, video encoder 20 may apply a 32×32 transform to chroma samples of TU 150, while applying transforms to luma samples with a finer granularity.

In another example, video encoder 20 may apply transforms to chroma samples at other RQT depths. For example, video encoder 20 may apply transforms to luma samples at leaf nodes 144, while applying a transform to chroma samples at node 142. Referring to FIG. 5B, video encoder 20 may apply 8×8 transforms to luma samples of each of sub-TUs 158, while applying an 8×8 transform to chroma samples of all sub-TUs 158. In this way, video encoder 20 may apply transforms to chroma samples at a relatively coarser granularity with respect to the RQT than luma samples for a given block of video data.

In some examples, video encoder 20 may limit the ability to split chroma samples associated with a TU at all. For example, video encoder 20 may split luma samples of TU 150 according to the RQT 130. However, video encoder 20 may not split chroma samples of TU 150 according to RQT 130. Rather, according to aspects of this disclosure, video encoder 20 may apply a transform to chroma samples at RQT depth zero (at root node 132). Video encoder 20 may still split luma samples according to RQT 130, and apply appropriate transforms to leaf nodes of RQT 130, in an example.

In other examples, video encoder 20 may implement a flag to identify whether the RQT depth at which a transform is applied to chroma samples is different than the RQT depth at which a transform is applied to luma samples. For example, when a node of a TU quadtree is split into four nodes, video encoder 20 may set a flag to indicate whether both the luma samples and the chroma samples are split. That is, video encoder 20 may set a flag to indicate whether a transform is applied to chroma samples without splitting. In an example, video encoder 20 may set a flag value to "0" if both the luma samples and the chroma samples are split according to the RQT, and may set a flag value to "1" if the luma samples are split according to the RQT, but the chroma samples are not split. In this example, video encoder 20 may apply differently sized transforms to the luma samples than the chroma samples. That is, for example, video encoder 20 may apply a smaller transform to luma samples than to chroma samples.

In an example for purposes of explanation, assume that video encoder 20 applies a transform to chroma samples at RQT depth one. In this example, video encoder 20 may signal that the chroma samples are not split at nodes 136A and 136B using a flag. In addition, video encoder 20 may apply a transform to chroma samples associated with nodes 134 and 136 and signal the chroma samples with nodes 134 and 136. According to aspects of this disclosure, video encoder 20 may decouple the manner in which transforms are applied to luma and chroma samples, and split luma samples according the RQT 130.

In some examples, video encoder 20 may signal a minimum transform size or RQT depth for chroma samples of TU 150. For example, video encoder 20 may signal the smallest transform size at which the chroma samples of TU 150 may be split. Alternatively or additionally, video encoder 20 may signal the lowest RQT depth at which the chroma samples may be split. Video encoder 20 may provide such signaling in a parameter set, such as a sequence parameter set (SPS), a picture parameter set (PPS), or in a slice header. In this example, video encoder 20 may apply a transform to chroma samples at the minimum transform size or lowest RQT depth (referred to below as "chroma division floor"), regardless of whether luma samples are further divided according to the RQT.

In examples in which video encoder 20 implements a chroma division floor, video encoder 20 may signal the chroma division floor in a variety of ways. In one example, video encoder 20 may signal the difference between the minimum RQT depth at which luma samples may be split and the minimum depth RQT depth at which chroma samples may be split. That is, in the example shown in FIG. 5A, luma samples may be divided according to RQT 130 to RQT depth three. Video encoder 20 may signal a chroma division floor by subtracting the chroma division floor from three and signaling the resulting value.

In some examples, a sequence parameter set (SPS) may be used to signal the chroma division floor. For example, an SPS may be formed according to Table 1 below:

TABLE 1

EXAMPLE SPS FOR CHROMA DIVISION FLOOR

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| pic_width_in_luma_samples | u(16) |
| pic_height_in_luma_samples | u(16) |
| bit_depth_luma_minus8 | ue(v) |
| bit_depth_chroma_minus8 | ue(v) |
| bit_depth_luma_increment | ue(v) |
| bit_depth_chroma_increment | ue(v) |
| log2_max_frame_num_minus4 | ue(v) |
| pic_order_cnt_type | ue(v) |
| if( pic_order_cnt_type = = 0 ) | |
|     log2_max_pic_order_cnt_lsb_minus4 | ue(v) |
| else if( pic_order_cnt_type = = 1 ) { | |
|     delta_pic_order_always_zero_flag | u(1) |
|     offset_for_non_ref_pic | se(v) |
|     num_ref_frames_in_pic_order_cnt_cycle | ue(v) |
|     for( i = 0; i < | |
|     num_ref_frames_in_pic_order_cnt_cycle; i++ ) | |
|         offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| delta_transform_hierarchy_depth_chroma_inter | ue(v) |
| max_transform_hierarchy_depth_intra | ue(v) |
| delta_transform_hierarchy_depth_chroma_intra | ue(v) |
| interpolation_filter_flag | u(1) |
| rbsp_trailing_bits( ) | |
| } | |

In the example shown in Table 1, the syntax element identified as delta_transform_hierarchy_depth_chroma_inter may indicate the difference between a minimum transform size of luma samples and a minimum transform size of chroma samples for inter pictures. The syntax element may be formed according to the equation below:

$$\log 2\text{MinTrafoSizeChroma} = \log 2\_\text{min\_coding\_block\_size\_minus3} + 3 + \log 2\text{diff\_max\_min\_coding\_block\_size} - \text{max\_transform\_hierarchy\_depth\_inter} - \text{delta\_transform\_hierarchy\_depth\_chroma\_inter} - 1$$

In this example, the value of the delta_transform_hierarchy_depth_chroma_inter syntax element may be positive, zero, or negative. For example, when the chroma transform depth is less than the luma transform depth (e.g., the RQT depths at which transforms are applied), the delta_transform_hierarchy_depth_chroma_inter syntax element may be less than zero.

In addition, according to the example shown in Table 1, the syntext element identified as delta_transform_hierarchy_depth_chroma_intra may indicate the difference between a minimum transform size of luma samples and a minimum transform size of chroma samples for intra pictures. The syntax element may be formed according to the equation below:

log 2MinTrafoSizeChroma=log 2_min_coding_
  block_size_minus3+3+log 2diff_max_min_cod-
  ing_block_size−max_transform_hierar-
  chy_depth_intra−delta_transform_hierar-
  chy_depth_chroma_intra−1

As noted above, in this example, the value of the delta_transform_hierarchy_depth_chroma_inter syntax element may be positive, zero, or negative. For example, when the chroma transform depth is less than the luma transform depth (e.g., the RQT depths at which transforms are applied), the delta_transform_hierarchy_depth_chroma_inter syntax element may be less than zero.

In another example, video encoder 20 may signal a difference between the leaf CU to which TU 150 corresponds and the minimum depth at which chroma samples may be split. For example, video encoder 20 may signal the difference between the RQT depth of root node 132 (RQT depth zero), which corresponds to an undivided TU that is equal in size to the leaf CU to which the TU corresponds, and the minimum depth at which chroma samples of TU 150 may be split. In some examples, a default value may be set. For example, a default value may be set such that the minimum transform size for chroma samples is equal to the size of the CU.

In some examples, a sequence parameter set (SPS) may be used to signal the chroma division floor. For example, an SPS may be formed according to Table 2 below:

TABLE 2

EXAMPLE SPS FOR CHROMA DIVISION FLOOR

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| pic_width_in_luma_samples | u(16) |
| pic_height_in_luma_samples | u(16) |
| bit_depth_luma_minus8 | ue(v) |
| bit_depth_chroma_minus8 | ue(v) |
| bit_depth_luma_increment | ue(v) |
| bit_depth_chroma_increment | ue(v) |
| log2_max_frame_num_minus4 | ue(v) |
| pic_order_cnt_type | ue(v) |
| if( pic_order_cnt_type = = 0 ) | |
|   log2_max_pic_order_cnt_lsb_minus4 | ue(v) |
| else if( pic_order_cnt_type = = 1 ) { | |
|   delta_pic_order_always_zero_flag | u(1) |

TABLE 2-continued

EXAMPLE SPS FOR CHROMA DIVISION FLOOR

| seq_parameter_set_rbsp( ) { | Descriptor |
|---|---|
|   offset_for_non_ref_pic | se(v) |
|   num_ref_frames_in_pic_order_cnt_cycle | ue(v) |
|   for( i = 0; i < | |
|   num_ref_frames_in_pic_order_cnt_cycle; i++ | |
|   ) | |
|     offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| chroma_transform_depth_delta_CU_inter | ue(v) |
| max_transform_hierarchy_depth_intra | ue(v) |
| chroma_transform_depth_delta_CU_intra | ue(v) |
| interpolation_filter_flag | u(1) |
| rbsp_trailing_bits( ) | |
| } | |

In the example shown in Table 2, chroma_transform_depth_delta_CU_inter may indicate the depth difference between the depth of the coding unit and the depth of the minimum chroma transform size for inter predicted pictures. The syntax element may be formed according to the equation below for inter predicted pictures. This value range may be at least equal to 1:

log 2MinTrafoSizeChroma=log 2CUSize−chroma_
  transform_depth_delta_CU_inter

In addition, according to the example shown in Table 2, the syntax element identified as chroma_transform_depth_delta_CU_intra may indicate the depth difference between the depth of the coding unit and the depth of the minimum chroma transform size for intra predicted pictures. The syntax element may be formed according to the equation below for intra predicted pictures. This value range may be at least equal to 1:

log 2MinTrafoSizeChroma=log 2CUSize−chroma_
  transform_depth_delta_CU_intra

In another example, a default value of chroma_transform_depth_delta_CU_inter and chroma_transform_depth_delta_CU_intra is set to a value of one by default, and thus does not need to be signaled.

In instances in which the chroma division floor is signaled according to Table 2 above, a transform tree may be signaled according to Table 3 below:

TABLE 3

TRANSFORM TREE SYNTAX

| transform_tree( x0, y0, log2TrafoSize, trafoDepth, blkIdx ) { | Descriptor |
|---|---|
|   if (trafoDepth = = 0 && IntraSplitFlag = = 0){ | |
|     if( !entropy_coding_mode_flag && PredMode != MODE_INTRA ) { | |
|       cbp_yuv_root | vlc(n,v) |
|       cbf_luma[ x0 ][ y0 ] [trafoDepth ] = cbp_yuv_root & 1 | |
|       cbf_cb[x0][y0] [trafoDepth ] = (cbp_yuv_root >> 1) & 1 | |
|       cbf_cr[x0][y0] [trafoDepth ] = (cbp_yuv_root >> 2) & 1 | |
|       residualDataPresentFlag = (cbp_yuv_root != 0) | |
|     } | |
|     else { | |
|       if( PredMode != MODE_INTRA) | |
|         no_residual_data_flag | u(1) \| ae(v) |
|       residualDataPresentFlag = !no_residual_data_flag | |
|     } | |

TABLE 3-continued

TRANSFORM TREE SYNTAX

| transform_tree( x0, y0, log2TrafoSize, trafoDepth, blkIdx ) { | Descriptor |
|---|---|
|     } | |
|   else { | |
|     residualDataPresentFlag = TRUE | |
|   } | |
|   if ( residualDataPresentFlag) { | |
|     intraSplitFlag = ( IntraSplitFlag && trafoDepth == 0 ? 1 : 0 ) | |
|     maxDepth = ( PredMode = = MODE_INTRA ? | |
|         max_transform_hierarchy_depth_intra + IntraSplitFlag : | |
|         max_transform_hierarchy_depth_inter ) | |
|     if( log2TrafoSize <= Log2MaxTrafoSize && | |
|       log2TrafoSize > Log2MinTrafoSize && | |
|       trafoDepth < maxDepth && !intraSplitFlag ) | |
|       split_transform_flag[ x0 ][ y0 ][ trafoDepth ] | u(1) \| ae(v) |
|     if( PredMode != MODE_INTRA && | |
|       log2TrafoSize <= Log2MaxTrafoSize && | |
|       entropy_coding_mode_flag ) { | |
|       firstChromaCbf_flag = (( log2TrafoSize = = Log2MaxTrafoSize \|\| | |
|         trafoDepth = = 0 ? 1 : 0 ) && | |
|         log2MinTrafoSizeChroma>= log2TrafoSize − 1) | |
|       if( firstChromaCbf_flag \|\| log2TrafoSize > Log2MinTrafoSize ) { | |
|         xBase = x0 − ( x0 & ( ( 1 << log2TrafoSize ) − 1 ) ) | |
|         yBase = y0 − ( y0 & ( ( 1 << log2TrafoSize ) − 1 ) ) | |
|         if( firstChromaCbf \|\| | |
|           cbf_cb[ xBase ][ yBase ][ trafoDepth − 1 ] ) | |
|           cbf_cb[ x0 ][ y0 ][ trafoDepth ] | u(1) \| ae(v) |
|         if( firstChromaCbf \|\| | |
|           cbf_cr[ xBase ][ yBase ][ trafoDepth − 1 ] ) | |
|           cbf_cr[ x0 ][ y0 ][ trafoDepth ] | u(1) \| ae(v) |
|       } | |
|     } | |
|     if( split_transform_flag[ x0 ][ y0 ][ trafoDepth ] ) { | |
|       x1 = x0 + ( ( 1 << log2TrafoSize ) >> 1 ) | |
|       y1 = y0 + ( ( 1 << log2TrafoSize ) >> 1 ) | |
|       transform_tree( x0, y0, log2TrafoSize − 1, trafoDepth + 1, 0 ) | |
|       transform_tree( x1, y0, log2TrafoSize − 1, trafoDepth + 1, 1 ) | |
|       transform_tree( x0, y1, log2TrafoSize − 1, trafoDepth + 1, 2 ) | |
|       transform_tree( x1, y1, log2TrafoSize − 1, trafoDepth + 1, 3 ) | |
|     } | |
|     else if( entropy_coding_mode_flag ){ | |
|       if( PredMode = = MODE_INTRA \|\| trafoDepth != 0 \|\| | |
|         cbf_cb[ x0 ][ y0 ][ trafoDepth ] \|\| | |
|         cbf_cr[ x0 ][ y0 ][ trafoDepth ] ) | |
|         cbf_luma[ x0 ][ y0 ][ trafoDepth ] | u(1) \| ae(v) |
|       if( PredMode = = MODE_INTRA ) | |
|         if( log2TrafoSize > Log2MinTrafoSize && | |
|           log2MinTrafoSizeChroma>= log2TrafoSize −1 ) { | |
|           cbf_cb[ x0 ][ y0 ][ trafoDepth ] | u(1) \| ae(v) |
|           cbf_cr[ x0 ][ y0 ][ trafoDepth ] | u(1) \| ae(v) |
|         } | |
|     } | |
|     if(trafoDepth = = 0 && | |
|       !entropy_coding_mode_flag && PredMode == MODE_INTRA) { | |
|       cbp_yuv_root | vlc(n,v) |
|       cbf_luma[ x0 ][ y0 ] [ 0 ] = cbp_yuv_root & 1 | |
|       cbf_cb[x0][y0] [ 0 ] = (cbp_yuv_root >> 1) & 1 | |
|       cbf_cr[x0][y0] [ 0 ] = (cbp_yuv_root >> 2) & 1 | |
|     } | |
|   } | |
| } | |

In the example of Table 3, chroma components may still use an RQT structure. For example, firstChromaCbf_flag is defined according to the follow equation:

firstChromaCbf_flag=((log 2TrafoSize==Log 2Max-TrafoSize||trafoDepth==0?1:0)&& log 2MinTrafoSizeChroma>=log 2TrafoSize−1)

In other examples, chroma components may not use the RQT structure. That is, for example, chroma components may be signaled at the CU level (depth zero of an RQT). In such an example, transform tree syntax may be generated according to Table 4 below:

TABLE 4

| TRANSFORM TREE SYNTAX | |
|---|---|
| transform_tree( x0, y0, log2TrafoSize, trafoDepth, blkIdx ) { | Descriptor |
|     if (trafoDepth = = 0 && entropy_coding_mode_flag &&( PredMode == MODE_INTRA) { | |
|         cbf_cb[x0][y0] [trafoDepth ] | u(1) \| ae(v) |
|         cbf_cr[x0][y0] [trafoDepth ] | u(1) \| ae(v) |
|     } | |
|     if (trafoDepth = = 0 && IntraSplitFlag = = 0){ | |
|         if( !entropy_coding_mode_flag && PredMode != MODE_INTRA ) { | |
|             cbp_yuv_root | vlc(n,v) |
|             cbf_luma[ x0 ][ y0 ] [trafoDepth ] = cbp_yuv_root & 1 | |
|             cbf_cb[x0][y0] [trafoDepth ] = (cbp_yuv_root >> 1) & 1 | |
|             cbf_cr[x0][y0] [trafoDepth ] = (cbp_yuv_root >> 2) & 1 | |
|             residualDataPresentFlag = (cbp_yuv_root != 0) | |
|         } | |
|         else { | |
|             if( PredMode != MODE_INTRA ) | |
|                 no_residual_data_flag | u(1) \| ae(v) |
|             residualDataPresentFlag = !no_residual_data_flag | |
|         } | |
|     } | |
|     else { | |
|         residualDataPresentFlag = TRUE | |
|     } | |
|     if ( residualDataPresentFlag) { | |
|     if (trafoDepth = = 0 && entropy_coding_mode_flag && PredMode != | |
|         MODE_INTRA ) { | |
|     cbf_cb[x0][y0] [trafoDepth ] | u(1) \| ae(v) |
|     cbf_cr[x0][y0] [trafoDepth ] | u(1) \| ae(v) |
|     } | |
|     intraSplitFlag = ( IntraSplitFlag && trafoDepth = = 0 ? 1 : 0 ) | |
|     maxDepth = ( PredMode = = MODE_INTRA ? max_transform_hierarchy_depth_intra + IntraSplitFlag : max_transform_hierarchy_depth_inter ) | |
|         if( log2TrafoSize <= Log2MaxTrafoSize && | |
|             log2TrafoSize > Log2MinTrafoSize && | |
|             trafoDepth < maxDepth && !intraSplitFlag ) | |
|             split_transform_flag[ x0 ][ y0 ][ trafoDepth ] | u(1) \| ae(v) |
|         if( split_transform_flag[ x0 ][ y0 ][ trafoDepth ] ) { | |
|             x1 = x0 + ( ( 1 << log2TrafoSize ) >> 1 ) | |
|             y1 = y0 + ( ( 1 << log2TrafoSize ) >> 1 ) | |
|             transform_tree( x0, y0, log2TrafoSize − 1, trafoDepth + 1, 0 ) | |
|             transform_tree( x1, y0, log2TrafoSize − 1, trafoDepth + 1, 1 ) | |
|             transform_tree( x0, y1, log2TrafoSize − 1, trafoDepth + 1, 2 ) | |
|             transform_tree( x1, y1, log2TrafoSize − 1, trafoDepth + 1, 3 ) | |
|         } | |
|         else if( entropy_coding_mode_flag ){ | |
|             if( PredMode = = MODE_INTRA \|\| trafoDepth != 0 \|\| | |
|                 cbf_cb[ x0 ][ y0 ][ trafoDepth ] \|\| | |
|                 cbf_cr[ x0 ][ y0 ][ trafoDepth ] ) | |
|                 cbf_luma[ x0 ][ y0 ][ trafoDepth ] | u(1) \| ae(v) |
|         } | |
|     } | |
|     if( !entropy_coding_mode_flag && PredMode == MODE_INTRA) | |
| { | |
|         cbp_yuv_root | vlc(n,v) |
|         cbf_luma[ x0 ][ y0 ] [ 0 ] = cbp_yuv_root & 1 | |
|         cbf_cb[x0][y0] [ 0 ] = (cbp_yuv_root >> 1) & 1 | |
|         cbf_cr[x0][y0] [ 0 ] = (cbp_yuv_root >> 2) & 1 | |
|     } | |
| } | |

In addition, when chroma components do not use the RQT structure, transform coefficient syntax may be generated according to Table 5 below:

TABLE 5

TRANSFORM COEFFICIENT SYNTAX

| transform_coeff( x0, y0, log2TrafoSize, trafoDepth, cIdx ) { | Descriptor |
|---|---|
|   if( ( ( cIdx = = 0 && cbf_luma[ x0 ][ y0 ][ trafoDepth ] ) \|\| | |
|      ( cIdx = = 1 && cbf_cb[ x0 ][ y0 ][ trafoDepth ] ) \|\| | |
|      ( cIdx = = 2 && cbf_cr[ x0 ][ y0 ][ trafoDepth ] ) ) ) { | |
|     if( split_transform_flag[ x0 ][ y0 ][ trafoDepth ] ) { | |
|       x1 = x0 + ( ( 1 << log2TrafoSize ) >> 1 ) | |
|       y1 = y0 + ( ( 1 << log2TrafoSize ) >> 1 ) | |
|       if( !entropy_coding_mode_flag] && | |
|         ( cIdx = = 0 \|\| log2TrafoSize > Log2MinTrafoSize + 1 ) | |
| ) { | |
|         if (cIdx==0) { | |
|           cbp_luma[ trafoDepth + 1 ] | vlc(n,v) |
|           cbf_luma[ x0 ][ y0 ][ trafoDepth + 1 ] = | |
| cbp_luma[ trafoDepth + 1 ] >> 3 | |
|           cbf_luma[ x1 ][ y0 ][ trafoDepth + 1 ] = | |
| cbp_luma[ trafoDepth+1 ] >> 2 | |
|           cbf_luma[ x0 ][ y1 ][ trafoDepth + 1 ] = | |
| cbp_luma[ trafoDepth + 1 ] >> 1 | |
|           cbf_luma[ x1 ][ y1 ][ trafoDepth + 1 ] = | |
| cbp_luma[ trafoDepth + 1 ] | |
|         } | |
|         else if(cIdx ==1 && log2MinTrafoSizeChroma>= | |
| log2TrafoSize −1) { | |
|           cbp_cb[ trafoDepth + 1 ] | vlc(n,v) |
|           cbf_cb[ x0 ][ y0 ][ trafoDepth + 1 ] = | |
| cbp_cb[ trafoDepth + 1 ] >> 3 | |
|           cbf_cb[ x1 ][ y0 ][ trafoDepth + 1 ] = | |
| cbp_cb[ trafoDepth+1 ] >> 2 | |
|           cbf_cb[ x0 ][ y1 ][ trafoDepth + 1 ] = | |
| cbp_cb[ trafoDepth + 1 ] >> 1 | |
|           cbf_cb[ x1 ][ y1 ][ trafoDepth + 1 ] = | |
| cbp_cb[ trafoDepth + 1 ] | |
|         } | |
|         else if(cIdx==2&& log2MinTrafoSizeChroma>= | |
| log2TrafoSize −1) { | |
|           cbp_cr[ trafoDepth + 1 ] | vlc(n,v) |
|           cbf_cr[ x0 ][ y0 ][ trafoDepth + 1 ] = | |
| cbp_cr[ trafoDepth + 1 ] >> 3 | |
|           cbf_cr[ x1 ][ y0 ][ trafoDepth + 1 ] = | |
| cbp_cr[ trafoDepth+1 ] >> 2 | |
|           cbf_cr[ x0 ][ y1 ][ trafoDepth + 1 ] = | |
| cbp_cr[ trafoDepth + 1 ] >> 1 | |
|           cbf_cr[ x1 ][ y1 ][ trafoDepth + 1 ] = | |
| cbp_cr[ trafoDepth + 1 ] | |
|         } | |
|       } | |
|       if( split_transform_flag[ x0 ][ y0 ][ trafoDepth ] && ( cIdx = = | |
| 0 \|\| | |
|         log2MinTrafoSizeChroma < log2TrafoSize −1)) { | |
|   transform_coeff( x0, y0, log2TrafoSize − 1, trafoDepth + 1, cIdx ) | |
|   transform_coeff( x1, y0, log2TrafoSize − 1, trafoDepth + 1, cIdx ) | |
|   transform_coeff( x0, y1, log2TrafoSize − 1, trafoDepth + 1, cIdx ) | |
|   transform_coeff( x1, y1, log2TrafoSize − 1, trafoDepth + 1, cIdx ) | |
|     } | |
|     else { | |
|       nMax = | |
| ( 1 << ( log2TrafoSize << 1 ) ) >> ( cIdx > 0 ? 2 : 0 ) | |
|       for( n = 0; n < nMax; n++ ) | |
|         transCoeffLevel[ x0 ][ y0 ][ trafoDepth ][ cIdx ][ n ] = 0 | |
|       if ( entropy_coding_mode_flag ) | |
|   residual_coding_cabac( x0, y0, log2TrafoSize, trafoDepth, cIdx ) | |
|       else if ( !entropy_coding_mode_flag ) | |
|   residual_coding_cavlc( x0, y0, log2TrafoSize, trafoDepth, cIdx ) | |
|     } | |
|   } | |
| } | |

In the example of Table 5, cbp_cb[trafoDepth] may be a 4-bit value with each bit equal to cbf_cb of one of the four chroma (Cb) transform blocks at the subdivision level trafoDepth. The array index trafoDepth may specify the current subdivision level of a coding unit into blocks for the purpose of transform coding. In addition, trafoDepth may be equal to zero for blocks that correspond to coding units.

According to aspects of this disclosure, when cbp_cb[trafoDepth] is not present, the value of cbf_cb[trafoDepth] may be inferred to be equal to zero.

In addition, cbp_cr[trafoDepth] may be a 4-bit value with each bit equal to cbf_cr of one of the four chroma (Cr) transform blocks at the subdivision level trafoDepth. The array index trafoDepth may specify the current subdivision level of a coding unit into blocks for the purpose of transform coding. In addition, trafoDepth may be equal to zero for blocks that correspond to coding units. According to aspects of this disclosure, when cbp_cr[trafoDepth] is not present, the value of cbf_cb[trafoDepth] may be inferred to be equal to zero.

According to the example shown in Table 5, when the condition: else if (cIdx==1&& log 2MinTrafoSizeChroma>=log 2TrafoSize−1) is not satisfied, the transform for chroma samples is performed in the parent node. Likewise, when the condition: else if (cIdx==2&& log 2MinTrafoSizeChroma>=log 2TrafoSize−1) is not satisfied, the transform for chroma samples is performed in the parent node. Likewise, when the condition: if (split_transform_flag [x0][y0][trafoDepth]&&(cIdx==0∥log 2MinTrafoSizeChroma<log 2TrafoSize−1)) is not satisfied, the transform for chroma samples is performed in the parent node.

In addition, when chroma components do not use the RQT structure, transform coefficient syntax may be generated according to Table 6 below:

purposes of explanation, it should be understood that other video coding units, such as other processors, processing units, hardware-based coding units including encoder/decoders (CODECs), and the like, may also be configured to perform the examples and techniques described with respect to FIGS. 5A and 5B.

Figure 6:
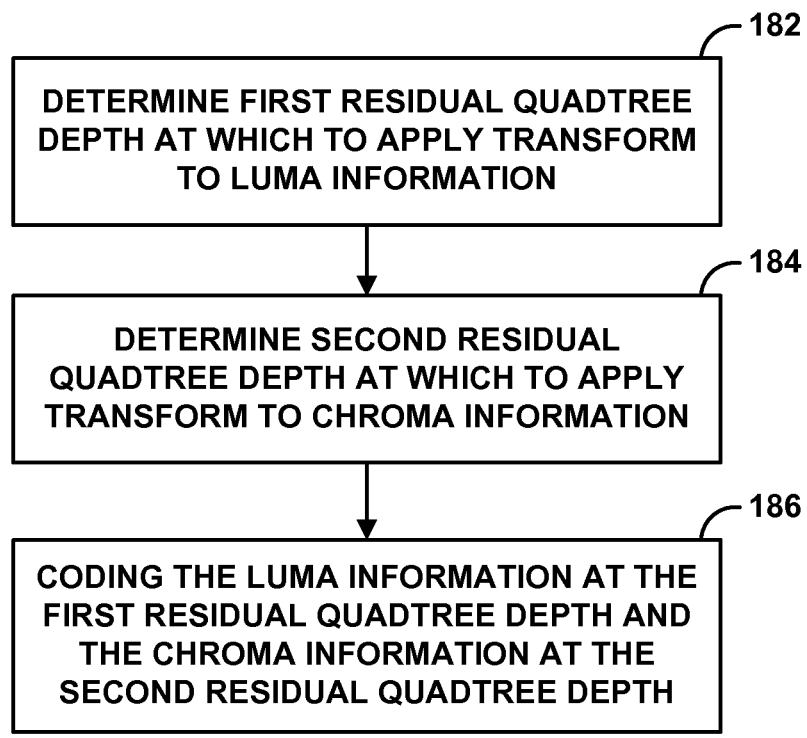
FIG. 6 is a flow diagram illustrating an example method of applying transforms to residual luma and chroma information, according to aspects of this disclosure.

FIG. 6 is a flow diagram illustrating a technique of coding video data consistent with this disclosure. The example shown in FIG. 6 is generally described as being performed by a video coder. It should be understood that, in some examples, the method of FIG. 6 may be carried out by video encoder 20 (FIGS. 1 and 2) or video decoder 30 (FIGS. 1 and 3), described above. In other examples, the method of FIG. 6 may be performed by a variety of other processors, processing units, hardware-based coding units such as encoder/decoders (CODECs), and the like.

According to aspects of this disclosure, the video coder may determine a first RQT depth at which to apply a transform to the luma information associated with a block of video data (182). Luma information may generally include data associated with a luma component of video data, regardless of the particular domain of the luma information. That is, luma information may include residual luma samples (e.g., spatial/pixel domain), which a video encoder (video encoder 20) may apply a transform to generate transform coefficients (e.g., transform domain). Conversely, luma information may include luma transform coefficients (e.g., transform domain), to which a video decoder (decoder

TABLE 6

TRANSFORM COEFFICIENT SYNTAX

| | Descriptor |
|---|---|
| transform_coeff( x0, y0, log2TrafoSize, trafoDepth, cIdx ) { | |
|   if( ( ( cIdx = = 0 && cbf_luma[ x0 ][ y0 ][ trafoDepth ] ) ) ) { | |
|     if( split_transform_flag[ x0 ][ y0 ][ trafoDepth ] ) { | |
|       x1 = x0 + ( ( 1 << log2TrafoSize ) >> 1 ) | |
|       y1 = y0 + ( ( 1 << log2TrafoSize ) >> 1 ) | |
|       if( !entropy_coding_mode_flag] && cIdx = = 0 ) | |
|         cbp_luma[ trafoDepth + 1 ] | vlc(n,v) |
|       cbf_luma[ x0 ][ y0 ][ trafoDepth + 1 ] = cbp_luma[ trafoDepth + 1 ] >> 3 | |
|       cbf_luma[ x1 ][ y0 ][ trafoDepth + 1 ] = cbp_luma[ trafoDepth+1 ] >> 2 | |
|       cbf_luma[ x0 ][ y1 ][ trafoDepth + 1 ] = cbp_luma[ trafoDepth + 1 ] >> 1 | |
|       cbf_luma[ x1 ][ y1 ][ trafoDepth + 1 ] = cbp_luma[ trafoDepth + 1 ] | |
|       transform_coeff( x0, y0, log2TrafoSize − 1, trafoDepth + 1, cIdx ) | |
|       transform_coeff( x1, y0, log2TrafoSize − 1, trafoDepth + 1, cIdx ) | |
|       transform_coeff( x0, y1, log2TrafoSize − 1, trafoDepth + 1, cIdx ) | |
|       transform_coeff( x1, y1, log2TrafoSize − 1, trafoDepth + 1, cIdx ) | |
|     } | |
|     else { | |
|       nMax = ( 1 << ( log2TrafoSize << 1 ) ) >> ( cIdx > 0 ? 2 : 0 ) | |
|       for( n = 0; n < nMax; n++ ) | |
|         transCoeffLevel[ x0 ][ y0 ][ trafoDepth ][ cIdx ][ n ] = 0 | |
|       if ( entropy_coding_mode_flag ) | |
|         residual_coding_cabac( x0, y0, log2TrafoSize, trafoDepth, cIdx ) | |
|       else if ( !entropy_coding_mode_flag ) | |
|         residual_coding_cavlc( x0, y0, log2TrafoSize, trafoDepth, cIdx ) | |
|     } | |
|   } | |
| } | |

While certain aspects of FIGS. 5A and 5B are described with respect to video encoder 20 and video decoder 30 for 30) may apply an inverse transform to generate residual luma samples (e.g., spatial/pixel domain).

In addition, with respect to RQT depth, in some examples, the video coder may determine am RQT for each leaf-CU of an LCU. That is, for a given CU, the video coder may determine the manner in which to divide the CU for purposes of transformation (e.g., divide the CU into one or more TUs according to an RQT). The video coder may apply transforms to luma information at the lowest depth of the determined RQT (e.g., leaf nodes of the RQT).

The video coder may also determine a second RQT depth at which to apply a transform to chroma information of the block of video data (184). Like luma information, chroma information may generally include data associated with a chroma component of video data (e.g., including Cr and Cb components), regardless of the particular domain of the chroma information. That is, chroma information may include residual chroma samples (e.g., spatial/pixel domain), which a video encoder (video encoder 20) may apply a transform to generate transform coefficients (e.g., transform domain). Conversely, chroma information may include chroma transform coefficients (e.g., transform domain), which a video decoder (decoder 30) may apply an inverse transform to generate residual chroma samples (e.g., spatial/pixel domain).

According to aspects of this disclosure, the video coder may determine an RQT depth at which to apply a transform to chroma information independently of the RQT depth at which to apply a transform to luma information. In some examples, the video coder may apply a transform to chroma information at a relatively higher RQT depth than the luma samples. For example, the video coder may not apply a transform to chroma information associated with leaf nodes of the RQT. Rather, the video coder may apply a transform to chroma information at a higher RQT depth (e.g., thereby applying a larger transform, relative to applying a transform at leaf nodes).

The video coder may then code the luma information at the first RQT depth and the chroma information at the second RQT depth (186). For example, in examples in which the video coder is a video encoder (e.g., video encoder 20), the video coder may encode the luma information and the chroma information by applying the appropriate transforms to residual luma and chroma samples, thereby generating transform coefficients in the transform domain. Alternatively, in examples in which the video coder is a video decoder (e.g., video decoder 30), the video coder may encode the luma information and the chroma information by applying the appropriate inverse transforms to transform coefficients, thereby generating residual luma and chroma samples in the pixel domain.

It should also be understood that the steps shown and described with respect to FIG. 6 are provided as merely one example. That is, the steps of the method of FIG. 6 need not necessarily be performed in the order shown in FIG. 6, and fewer, additional, or alternative steps may be performed.

Figure 7:
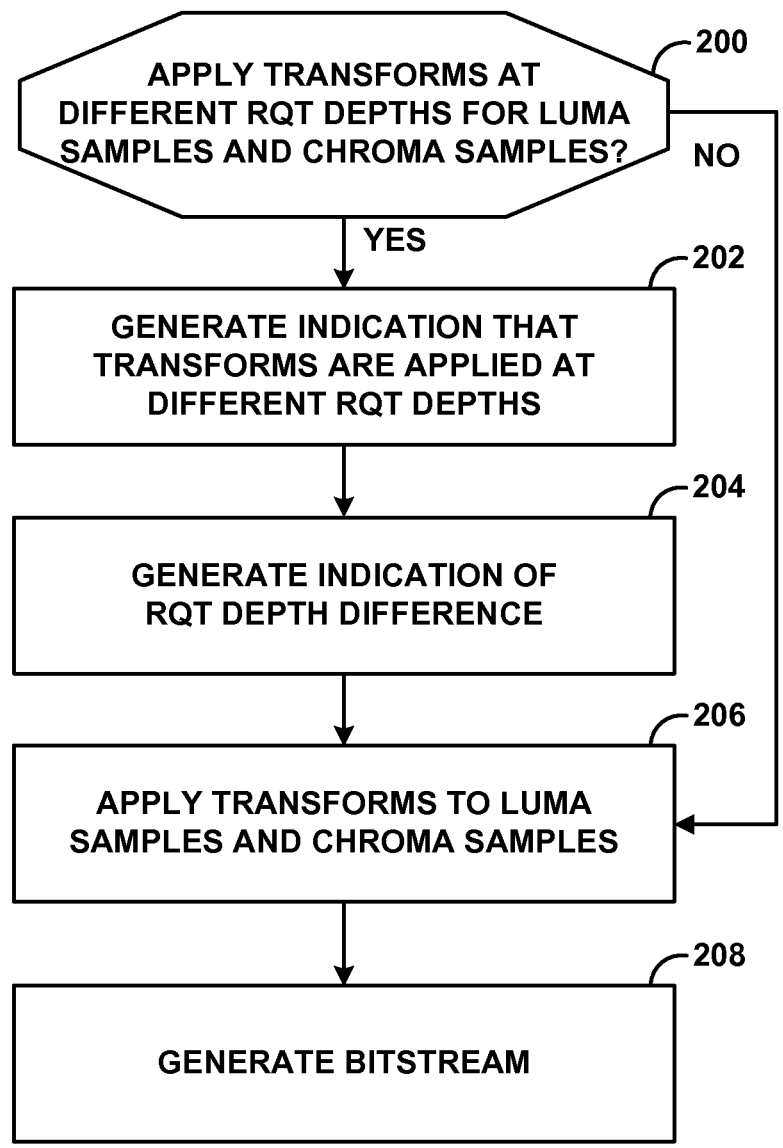
FIG. 7 is a flow diagram illustrating an example method of encoding transform information, according to aspects of this disclosure.

FIG. 7 is a flow diagram illustrating a technique of encoding video data consistent with this disclosure. Although generally described as performed by components of video encoder 20 (FIGS. 1 and 2) for purposes of explanation, it should be understood that other video coding units, processors, processing units, hardware-based coding units such as encoder/decoders (CODECs), and the like, may also be configured to perform the method of FIG. 7.

According to the example method shown in FIG. 7, video encoder 20 may determine whether to apply transforms to residual luma samples at a different RQT depth than residual chroma samples (200). Video encoder 20 may make the determination, for example, based on a rate-distortion or other coding analysis. If video encoder 20 does apply transforms to residual luma samples at a different RQT depth than residual chroma samples (the "YES" branch of step 200), video encoder 20 may generate an indication that transforms are applied at different RQT depths (202). For example, video encoder 20 may set a flag indicating that transforms are applied at different RQT depths.

In some examples, video encoder 20 also generates an indication of the RQT depth difference (204). That is, video encoder 20 generates an indication of the difference between the RQT depth at which transforms are applied to luma samples and the RQT depth at which transforms are applied to chroma samples. In other examples, such an indication may not be needed. For example, video encoder 20 may implement a default RQT depth at which to apply transforms to chroma samples. In such an example, video encoder 20 may not generate an indication of the RQT depth difference.

Video encoder 20 also applies transforms to luma samples and chroma samples (206). Accordingly, video encoder 20 generates luma transform coefficients and chroma transform coefficients for the video data. Video encoder 20 generates a bitstream (208) containing the luma and chroma transform coefficients (e.g., in some examples, after quantization). Video encoder 20 may also include the indication that transforms are applied at different depths and/or an indication of the RQT depth difference in the bitstream. Because video encoder 20 may signal chroma transform coefficients at a higher RQT depth than luma transform coefficients, in some instances, video encoder 20 may signal chroma transform coefficients prior to luma coefficients. That is, video encoder 20 may signal chroma transform coefficients associated with nodes at a higher depth than leaf nodes, where video encoder 20 signals luma transform coefficients.

It should also be understood that the steps shown and described with respect to FIG. 7 are provided as merely one example. That is, the steps of the method of FIG. 7 need not necessarily be performed in the order shown in FIG. 7, and fewer, additional, or alternative steps may be performed. For example, in some instances, video encoder 20 may not provide an indication that transforms are applied at different RQT depths (202), and/or may not provide an indication of the RQT depth difference (204).

Figure 8:
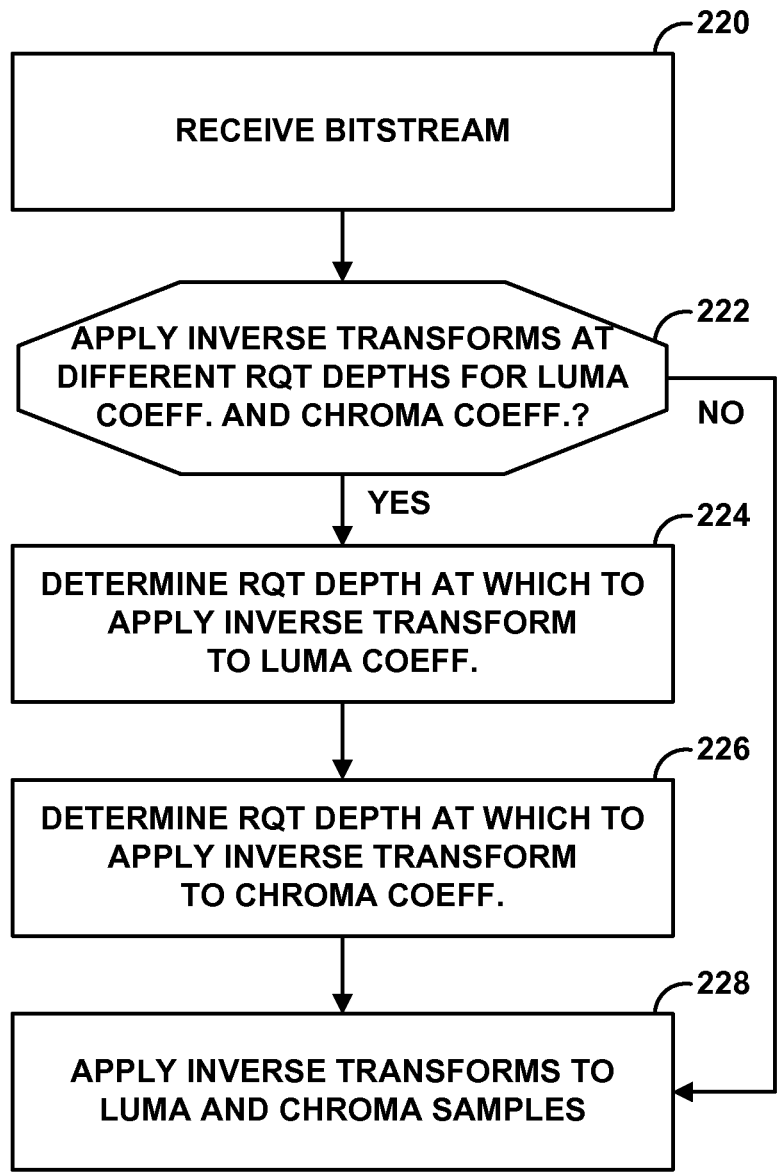
FIG. 8 is a flow diagram illustrating an example method of decoding transform information, according to aspects of this disclosure.

FIG. 8 is a flow diagram illustrating a technique of decoding video data consistent with this disclosure. Although generally described as performed by components of video decoder 30 (FIGS. 1 and 3) for purposes of explanation, it should be understood that other video coding units, processors, processing units, hardware-based coding units such as encoder/decoders (CODECs), and the like, may also be configured to perform the method of FIG. 8.

Video decoder 30 receives an encoded bitstream (220). Video decoder 30 then determines whether to apply inverse transforms to received luma transform coefficients at a different RQT depth than chroma transform coefficients (222). In some instances, video decoder 30 may make such a determination based on an indication included in the received bitstream. For example, as described above with respect to FIG. 7, video decoder 30 may make such a determination based on a flag included in the received bitstream that indicates transforms were applied to luma samples at different depths than chroma samples. In other examples, video decoder 30 may determine whether to apply inverse transforms at different RQT depths for luma and chroma coefficients by default, without such signaling.

If transforms are applied at different depths (the "YES" branch of step 222), video decoder 30 may determine the RQT depth at which to apply an inverse transform to luma transform coefficients (224). In some examples, video decoder 30 may be preprogrammed to apply an inverse transform to luma transform coefficients at leaf-nodes of the RQT.

In addition, video decoder 30 may determine the RQT depth at which to apply an inverse transform to chroma coefficients (226). In some examples, video decoder 30 may be preprogrammed to apply an inverse transform to chroma transform coefficients at a certain default RQT depth. For example, video decoder 30 may be preprogrammed to apply an inverse transforms to chroma transform coefficients at an RQT depth of zero or an RQT depth of one.

In another example, video decoder 30 may determine the RQT depth at which to apply an inverse transform based on an indication received in the bitstream. For example, video decoder 30 may receive an indication of the difference between the RQT depth at which to apply an inverse transform to luma transform coefficients and the RQT depth at which to apply an inverse transform to chroma transform coefficients. In other examples, video decoder 30 may receive an alternative indication that represents the RQT depth at which to apply an inverse transform to chroma transform coefficients. For example, video decoder 30 may infer an RQT depth at which to apply an inverse transform based on the size of the received block, or other criteria. After determining the RQT depths at which to apply the inverse transforms, video decoder 30 may apply the inverse transforms to the luma transform coefficients and the chroma transform coefficients (228). In some examples, the chroma transform coefficients may be included in the bitstream prior to the luma transform coefficients. Accordingly, video decoder 30 may apply an inverse transform to chroma transform coefficients prior to applying an inverse transform to luma coefficients. By applying the inverse transforms to the luma and chroma transform coefficients, video decoder 30 may generate residual luma and chroma samples.

It should also be understood that the steps shown and described with respect to FIG. 8 are provided as merely one example. That is, the steps of the method of FIG. 8 need not necessarily be performed in the order shown in FIG. 8, and fewer, additional, or alternative steps may be performed.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

It should also be understood that, while certain aspects of this disclosure have been described with respect to the emerging HEVC standard, e.g., with respect to CUs, PUs, and TUs, the techniques of this disclosure are not limited in this way. That is, the techniques of this disclosure broadly apply to applying transforms to luma and chroma samples associated with a block of video data, and are not limited to any specific coding standard.

In one or more examples, the functions described in this disclosure may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of coding video data, the method comprising:
determining, by a video coder, for a coding unit (CU) of video data having luma information, chroma information and a residual quad tree (RQT) having a plurality of depth levels, a first RQT depth level of the plurality of depth levels of the RQT, wherein the RQT represents a manner in which transforms are applied to the luma information and the chroma information, wherein:
each respective depth level of the plurality of depth levels of the RQT corresponds to a respective luma transform size and a respective chroma transform size, a height and a width of the respective luma transform size being two times greater than a height and a width of a luma transform size corresponding to a next depth level deeper in the RQT than the respective depth level, and a height and a width of the respective chroma transform size being two times greater than a height and a width of a chroma transform size corresponding to a next depth level deeper in the RQT than the respective depth level,
the luma transform size corresponding to level 0 of the RQT is equal to a size of a luma block of the CU that includes all samples of a luma component in the CU, and
the chroma transform size corresponding to level 0 of the RQT is equal to a size of a chroma block of the CU that includes all samples of a chroma component in the CU;
applying, by the video coder, a first transform to the luma information of the CU, wherein the first transform has a transform size equal to the luma transform size corresponding to the first RQT depth level;
determining, by the video coder, separately from determining the first RQT depth level for the luma information, a second RQT depth level of the plurality of depth levels of the RQT, wherein the second RQT depth level is equal to 0;
applying, by the video coder, a second transform to the chroma information of the CU, wherein the second transform has a transform size equal to the chroma transform size corresponding to the second RQT depth level, the second RQT depth level is not equal to the first RQT depth level, and the second transform RQT depth level is less deep in the RQT than the first RQT depth level.

2. The method of claim 1, wherein:
the luma information comprises residual luma samples and the chroma information comprises residual chroma samples,
applying the first transform comprises applying, by the video coder, the first transform to the residual luma samples to generate luma transform coefficients; and
applying the second transform comprises applying, by the video coder, the second transform to the residual chroma samples to generate chroma transform coefficients.

3. The method of claim 2, further comprising:
generating, by the video coder, a bitstream comprising an indication of the luma transform coefficients at the first RQT depth level and an indication of the chroma transform coefficients at the second RQT depth level.

4. The method of claim 1, wherein:
the luma information comprises luma transform coefficients and the chroma information comprises chroma transform coefficients,
applying, by the video coder, the first transform comprises applying the first transform to the luma transform coefficients to generate residual luma samples, and
applying, by the video coder, the second transform comprises applying the second transform to the chroma transform coefficients to generate residual chroma samples.

5. The method of claim 1, wherein the first transform is smaller than the second transform.

6. The method of claim 1, wherein determining the second RQT depth comprises determining, by the video coder, a difference between the first RQT depth level and the second RQT depth level.

7. The method of claim 6, wherein determining the difference comprises decoding, by the video coder, one of a sequence parameter set (SPS), a picture parameter set (PPS), and a slice header containing an indication of the difference.

8. The method of claim 1, wherein determining the second RQT depth level comprises determining, by the video coder, a predetermined RQT depth.

9. The method of claim 1, further comprising coding, by the video coder, an indication that the second RQT depth level is different than the first RQT depth level.

10. The method of claim 9, wherein coding the indication comprises coding, by the video coder, a flag indicating that the chroma information is signaled at a different RQT depth level than the luma information.

11. An apparatus for coding video data, the apparatus comprising:
a memory configured to store a coding unit (CU) of video data, the CU having luma information, chroma information and a residual quad tree (RQT) having a plurality of depth levels; and
one or more processors configured to:
determine, for the CU, a first RQT depth level of the plurality of depth levels of the RQT for the block of video data at which to apply, wherein the RQT represents a manner in which transforms are applied to the luma information and the chroma information, wherein:
each respective depth level of the plurality of depth levels of the RQT corresponds to a respective luma transform size and a respective chroma transform size, a height and a width of the respective luma transform size being two times greater than a height and a width of a luma transform size corresponding to a next depth level deeper in the RQT than the respective depth level, and a height and a width of the respective chroma transform size being two times greater than a height and a width of a chroma transform size corresponding to a next depth level deeper in the RQT than the respective depth level,
the luma transform size corresponding to level 0 of the RQT is equal to a size of a luma block of the CU that includes all samples of a luma component in the CU, and
the chroma transform size corresponding to level 0 of the RQT is equal to a size of a chroma block of the CU that includes all samples of a chroma component in the CU;

apply a first transform to the luma information of the CU, wherein the first transform has a transform size equal to the luma transform size corresponding to the first RQT depth level;

determine, separately from determining the first RQT depth for the luma information, a second RQT depth level of the plurality of depth levels of the RQT, wherein the second RQT depth level is equal to 0;

apply a second transform to the chroma information of the CU, wherein the second transform has a transform size equal to the chroma transform size corresponding to the second RQT depth level, the second RQT depth level is not equal to the first RQT depth level, and the second transform RQT depth level is less deep in the RQT than the first RQT depth level.

12. The apparatus of claim 11, wherein:

the luma information comprises residual luma samples and the chroma information comprises residual chroma samples, and the one or more processors of the video encoder are configured to:

apply the first transform to the residual luma samples to generate luma transform coefficients; and apply the second transform to the residual chroma samples to generate chroma transform coefficients.

13. The apparatus of claim 12, wherein the one or more processors of the video encoder are configured to:

generate a bitstream comprising an indication of the luma transform coefficients at the first RQT depth level and comprising an indication of the chroma transform coefficients at the second RQT depth level.

14. The apparatus of claim 11, wherein the luma information comprises luma transform coefficients and the chroma information comprises chroma transform coefficients, and wherein the one or more processors are configured to:

apply the first transform to the luma transform coefficients to generate residual luma samples; and apply the second transform to the chroma transform coefficients to generate residual chroma samples.

15. The apparatus of claim 11, wherein the first transform is smaller than the second transform.

16. The apparatus of claim 11, wherein, to determine the second RQT depth level, the one or more processors are configured to determine a difference between the first RQT depth level and the second RQT depth level.

17. The apparatus of claim 16, wherein, to determine the difference, the one or more processors are configured to decode one of a sequence parameter set (SPS), a picture parameter set (PPS), and a slice header containing an indication of the difference.

18. The apparatus of claim 11, wherein, to determine the second RQT depth level, the one or more processors are configured to determine a predetermined RQT depth level.

19. The apparatus of claim 11, wherein the one or more processors are further configured to code an indication that the second RQT depth level is different than the first RQT depth level.

20. The apparatus of claim 19, wherein, to code the indication, the one or more processors are configured to code a flag indicating that chroma information is signaled at a different RQT depth level than luma information.

21. The apparatus of claim 11, wherein the apparatus comprises a video encoder.

22. The apparatus of claim 11, wherein the apparatus comprises a video decoder.

23. An apparatus for coding video data, the apparatus comprising:

means for determining, for a coding unit (CU) of video data having luma information, chroma information and a residual quad tree (RQT) having a plurality of depth levels, a first RQT depth level of the plurality of depth levels of the RQT, wherein the RQT represents a manner in which transforms are applied to the luma information and the chroma information, wherein:

each respective depth level of the plurality of depth levels of the RQT corresponds to a respective luma transform size and a respective chroma transform size, a height and a width of the respective luma transform size being two times greater than a height and a width of a luma transform size corresponding to a next depth level deeper in the RQT than the respective depth level, and a height and a width of the respective chroma transform size being two times greater than a height and a width of a chroma transform size corresponding to a next depth level deeper in the RQT than the respective depth level, the luma transform size corresponding to level 0 of the RQT is equal to a size of a luma block of the CU that includes all samples of a luma component in the CU, and the chroma transform size corresponding to level 0 of the RQT is equal to a size of a chroma block of the CU that includes all samples of a chroma component in the CU;

means for applying a first transform to the luma information of the CU, wherein the first transform has a transform size equal to the luma transform size corresponding to the first RQT depth level;

means for determining, separately from determining the first RQT depth for the luma information, a second RQT depth level of the plurality of depth levels of the RQT, wherein the second RQT depth level is equal to 0; and means for applying a second transform to the chroma information of the CU, wherein the second transform has a transform size equal to the chroma transform size corresponding to the second RQT depth level, the second RQT depth level is not equal to the first RQT depth level, and the second transform RQT depth level is less deep in the RQT than the first RQT depth level.

24. The apparatus of claim 23, wherein:

the luma information comprises residual luma samples and the chroma information comprises residual chroma samples, the means for applying the first transform comprises means for applying the first transform to the residual luma samples to generate luma transform coefficients, and the means for applying the second transform comprises means for applying the second transform to the residual chroma samples to generate chroma transform coefficients.

25. The apparatus of claim 24, further comprising:

means for generating a bitstream comprising an indication of the luma transform coefficients at the first RQT depth and comprising an indication of the chroma transform coefficients at the second RQT depth.

26. The apparatus of claim 23, wherein:

the luma information comprises luma transform coefficients and the chroma information comprises chroma transform coefficients, the means for applying the first transform applies the first transform to the luma transform coefficients to generate residual luma samples; and the means for applying the second transform applies the second transform to the chroma transform coefficients to generate residual chroma samples.

27. The apparatus of claim 23, wherein the first transform is smaller than the second transform.

28. The apparatus of claim 23, wherein the means for determining the second RQT depth comprises means for determining a difference between the first RQT depth level and the second RQT depth level.

29. The apparatus of claim 23, wherein the means for determining the second RQT depth level comprises means for determining a predetermined RQT depth level.

30. The apparatus of claim 23, further comprising means for coding an indication that the second RQT depth level is different than the first RQT depth level.

31. A non-transitory computer-readable storage medium having stored thereon instructions that, when executed, cause one or more processors of a device for coding video data to:

determine, for a coding unit (CU) of video data having luma information, chroma information and a residual quad tree (RQT) having a plurality of depth levels, a first RQT depth level of the plurality of depth levels of the RQT, wherein the RQT represents a manner in which transforms are applied to the luma information and the chroma information, wherein:

each respective depth level of the plurality of depth levels of the RQT corresponds to a respective luma transform size and a respective chroma transform size, a height and a width of the respective luma transform size being two times greater than a height and a width of a luma transform size corresponding to a next depth level deeper in the RQT than the respective depth level, and a height and a width of the respective chroma transform size being two times greater than a height and a width of a chroma transform size corresponding to a next depth level deeper in the RQT than the respective depth level, the luma transform size corresponding to level 0 of the RQT is equal to a size of a luma block of the CU that includes all samples of a luma component in the CU, and the chroma transform size corresponding to level 0 of the RQT is equal to a size of a chroma block of the CU that includes all samples of a chroma component in the CU;

apply a first transform to the luma information of the CU, wherein the first transform has a transform size equal to the luma transform size corresponding to the first RQT depth level;

determine, separately from determining the first RQT depth for the luma information, a second RQT depth level of the plurality of depth levels of the RQT, wherein the second RQT depth level is equal to 0;

apply a second transform to the chroma information of the CU, wherein the second transform has a transform size equal to the chroma transform size corresponding to the second RQT depth level, the second RQT depth level is not equal to the first RQT depth level, and the second transform RQT depth level is less deep in the RQT than the first RQT depth level.

32. The method of claim 1, the method being executable on a wireless communication device, wherein the device comprises:

a memory configured to store video data including the CU;

a processor configured to execute instructions to process the video data stored in said memory; and a receiver configured to receive the video data.

33. The method of claim 32, wherein the wireless communication device is a cellular telephone and the video data is received by the receiver and modulated according to a cellular communication standard.

34. The device of claim 11, wherein the device is a wireless communication device, further comprising a receiver configured to receive video data that includes the CU.

35. The device of claim 34, wherein the wireless communication device is a cellular telephone and the video data is received by the receiver and modulated according to a cellular communication standard.

* * * * *